US010209785B2

(12) United States Patent
Burns

(10) Patent No.: US 10,209,785 B2
(45) Date of Patent: Feb. 19, 2019

(54) VOLATILITY BASED CURSOR TETHERING

(71) Applicant: Microsoft Technology Licensing, LLC, Redmond, WA (US)

(72) Inventor: Aaron Burns, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 15/013,635

(22) Filed: Feb. 2, 2016

(65) Prior Publication Data
US 2017/0220134 A1 Aug. 3, 2017

(51) Int. Cl.
*G06F 3/0346* (2013.01)
*G02B 27/01* (2006.01)
*G06F 3/01* (2006.01)
*G06F 3/0481* (2013.01)

(52) U.S. Cl.
CPC ....... *G06F 3/0346* (2013.01); *G02B 27/0172* (2013.01); *G06F 3/011* (2013.01); *G06F 3/0481* (2013.01); *G06F 3/04812* (2013.01); *G06F 3/04815* (2013.01); *G02B 2027/0178* (2013.01)

(58) Field of Classification Search
CPC ........ G02B 2027/0178; G02B 27/0172; G06F 3/0346; G06F 3/0481
See application file for complete search history.

(56) References Cited

U.S. PATENT DOCUMENTS 6,965,369 B2 * 11/2005 Rensberger ............. G06F 3/038
345/156
7,683,883 B2 3/2010 Touma et al.
8,467,133 B2 * 6/2013 Miller .................. G02B 27/017
353/28
8,472,120 B2 * 6/2013 Border ............... G02B 27/0093
353/28
8,477,425 B2 * 7/2013 Border ................. G02B 27/017
353/28

(Continued)

FOREIGN PATENT DOCUMENTS

EP 0285315 A2 10/1988

OTHER PUBLICATIONS

Valis, S., et al., "Sharing viewpoints in collaborative virtual environments," Proceedings of the 34th Hawaii International Conference on System Sciences, Jan. 3, 2001, pp. 257-268.

(Continued)

*Primary Examiner* — Chun-Nan Lin
(74) *Attorney, Agent, or Firm* — Arent Fox LLP

(57) ABSTRACT

Modifying a tether linked to a cursor based on depth volatility of the cursor is disclosed. Multiple displays show a three-dimensional image that seems to be at the same real world location regardless of the location of the display. One person operates a cursor in the three-dimensional image. Volatility of depth of the cursor from the viewpoint of the cursor operator is tracked. The appearance of the tether is changed in other displays in response to the depth volatility. The tether may include a line from the cursor towards the cursor operator. The tether is not necessarily displayed all of the time so as to not obscure the view of the three-dimensional image. When there is not any depth volatility for some time, the tether is not displayed. In response to high depth volatility, the tether may be displayed as a long line from the cursor.

14 Claims, 18 Drawing Sheets

(56) References Cited

U.S. PATENT DOCUMENTS

| | | | | |
|---|---|---|---|---|
| 8,488,246 | B2* | 7/2013 | Border | G02B 27/017 353/28 |
| 8,717,318 | B2 | 5/2014 | Anderson et al. | |
| 8,736,583 | B2 | 5/2014 | Anderson et al. | |
| 9,285,589 | B2* | 3/2016 | Osterhout | G02B 27/017 |
| 9,652,668 | B2* | 5/2017 | Holz | H04N 5/232 |
| 2007/0002037 | A1* | 1/2007 | Kuroki | G06T 19/006 345/418 |
| 2009/0284532 | A1* | 11/2009 | Kerr | G06F 3/0481 345/442 |
| 2012/0212398 | A1* | 8/2012 | Border | G02B 27/017 345/8 |
| 2012/0212400 | A1* | 8/2012 | Border | G02B 27/017 345/8 |
| 2012/0212484 | A1* | 8/2012 | Haddick | G02B 27/0093 345/419 |
| 2012/0212499 | A1* | 8/2012 | Haddick | G02B 27/0093 345/589 |
| 2012/0218172 | A1* | 8/2012 | Border | G02B 27/0093 345/8 |
| 2012/0235886 | A1* | 9/2012 | Border | G02B 27/0093 345/8 |
| 2012/0236031 | A1* | 9/2012 | Haddick | G02B 27/0093 345/633 |
| 2013/0127980 | A1* | 5/2013 | Haddick | G06F 3/013 348/14.08 |
| 2013/0278631 | A1* | 10/2013 | Border | G02B 27/017 345/633 |
| 2014/0258942 | A1* | 9/2014 | Kutliroff | G06F 3/013 715/863 |
| 2014/0354548 | A1* | 12/2014 | Lee | G06F 3/0346 345/166 |
| 2014/0368533 | A1* | 12/2014 | Salter | G02B 27/017 345/619 |
| 2014/0372934 | A1* | 12/2014 | Pereira | G06F 3/04842 715/781 |
| 2014/0372944 | A1* | 12/2014 | Mulcahy | G06F 3/04815 715/810 |
| 2015/0015491 | A1 | 1/2015 | Lee | |
| 2015/0193018 | A1* | 7/2015 | Venable | G06F 3/0346 345/158 |
| 2016/0025981 | A1* | 1/2016 | Burns | G02B 27/0093 345/156 |
| 2016/0026242 | A1* | 1/2016 | Burns | H04N 9/31 345/633 |
| 2016/0027213 | A1* | 1/2016 | Burns | G06T 7/73 345/633 |
| 2016/0187654 | A1* | 6/2016 | Border | G02B 5/04 359/567 |
| 2016/0210784 | A1* | 7/2016 | Ramsby | G06T 19/006 |
| 2016/0378294 | A1* | 12/2016 | Wright | G06F 3/04815 715/851 |

OTHER PUBLICATIONS

International Search Report & The Written Opinion of the International Searching Authority dated May 4, 2017, International Application No. PCT/US2017/013685 filed Jan. 17, 2017.

Wang, Wenbi, "Dynamic Viewpoint Tethering: Enhancing Control Performance in Virtual Worlds", In Proceedings of Extended Abstracts on Human Factors in Computing Systems, Apr. 5, 2003, pp. 1026-1027.

Steinicke, et al., "Object Selection in Virtual Environments with an Improved Virtual Pointer Metaphor", In Proceedings of the International Conference on Computer Vision and Graphics, Sep. 2004, pp. 1-8.

* cited by examiner

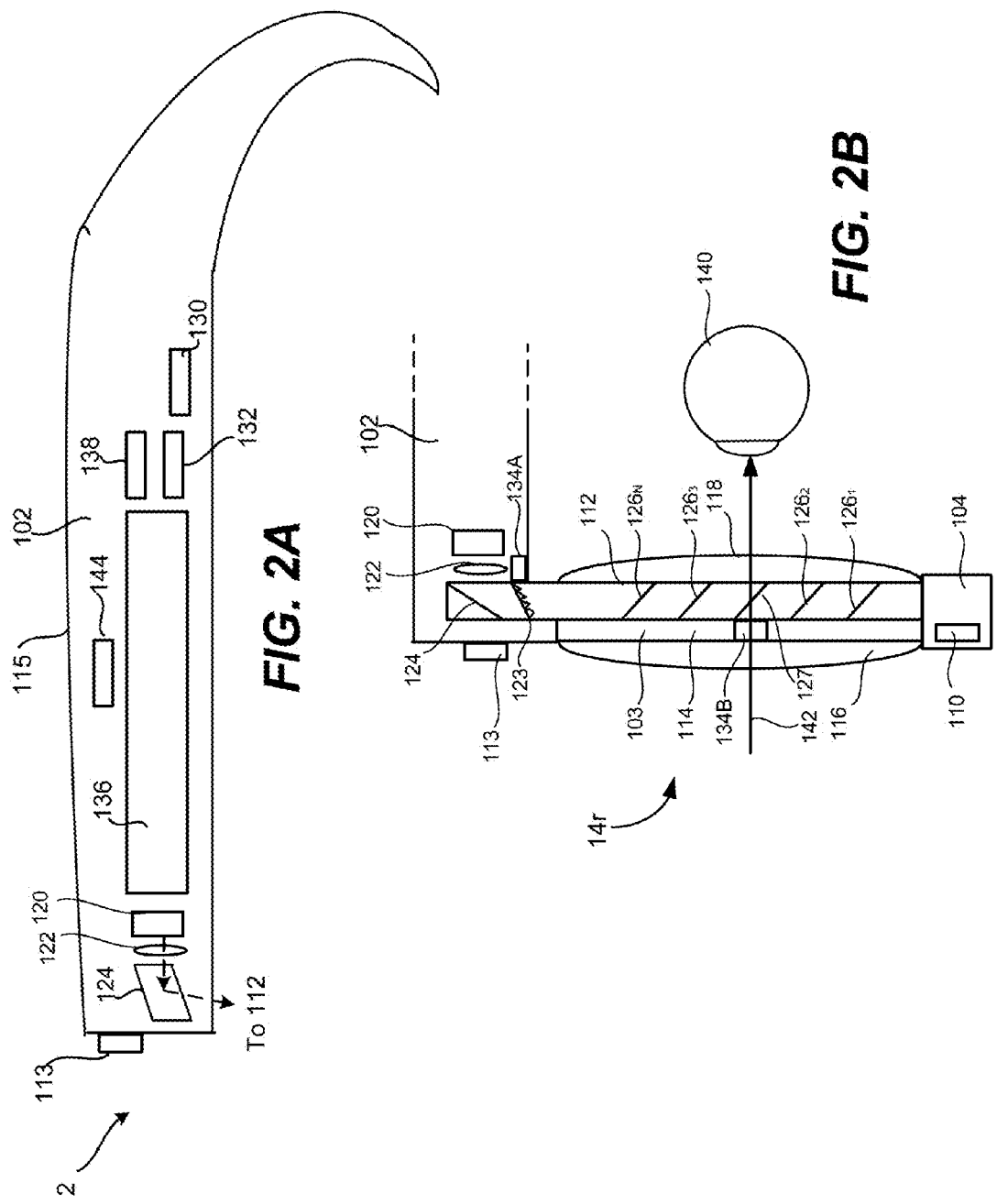

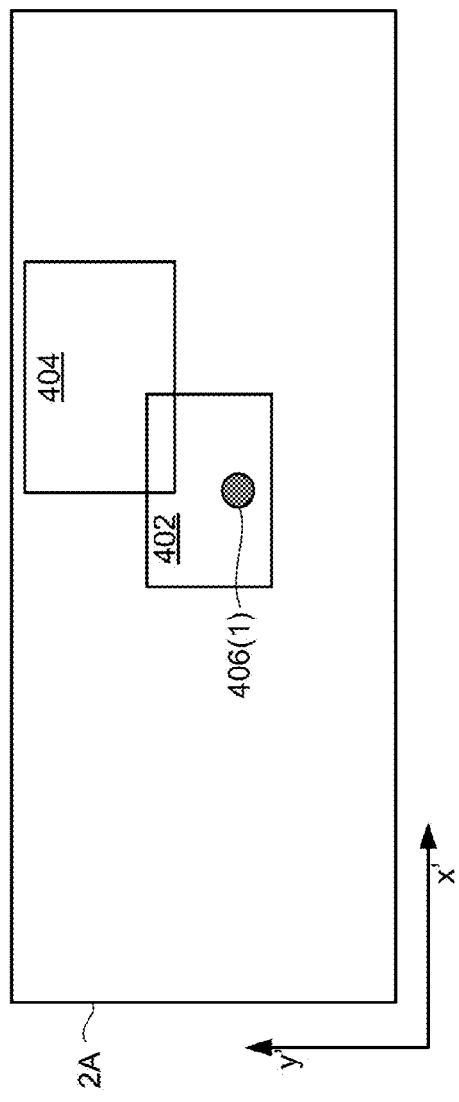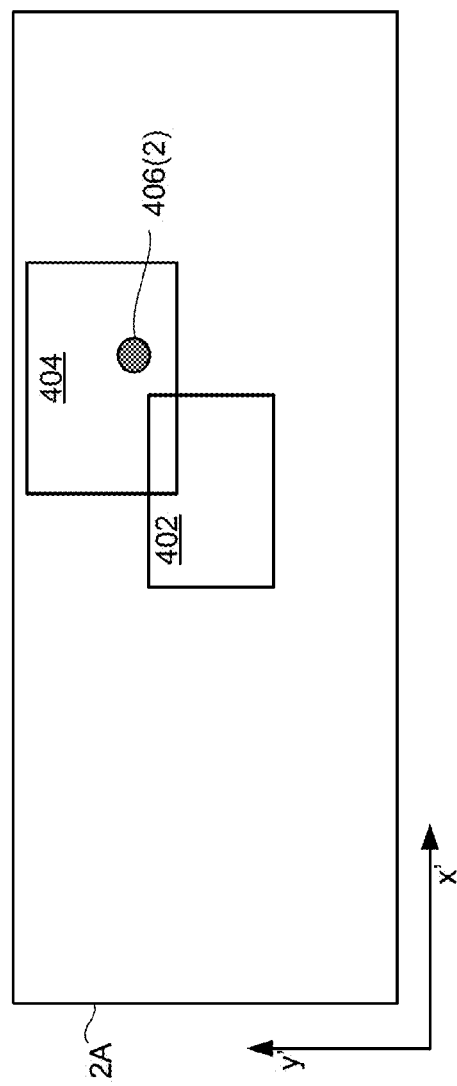

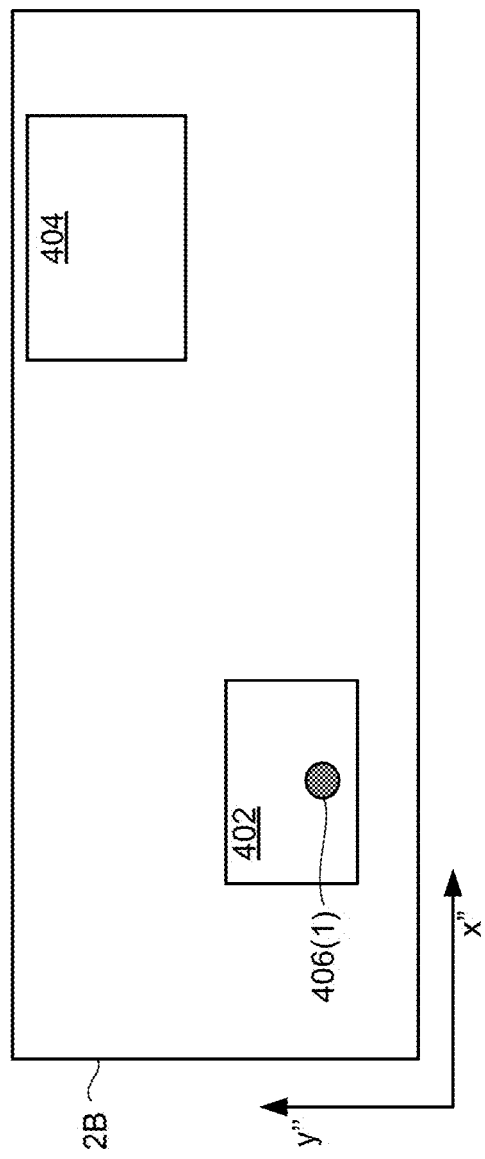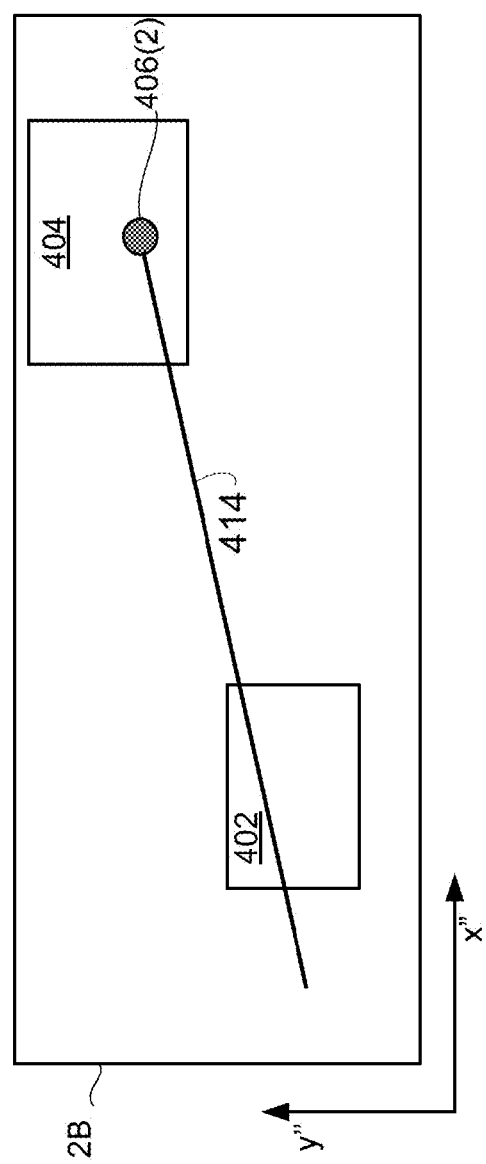

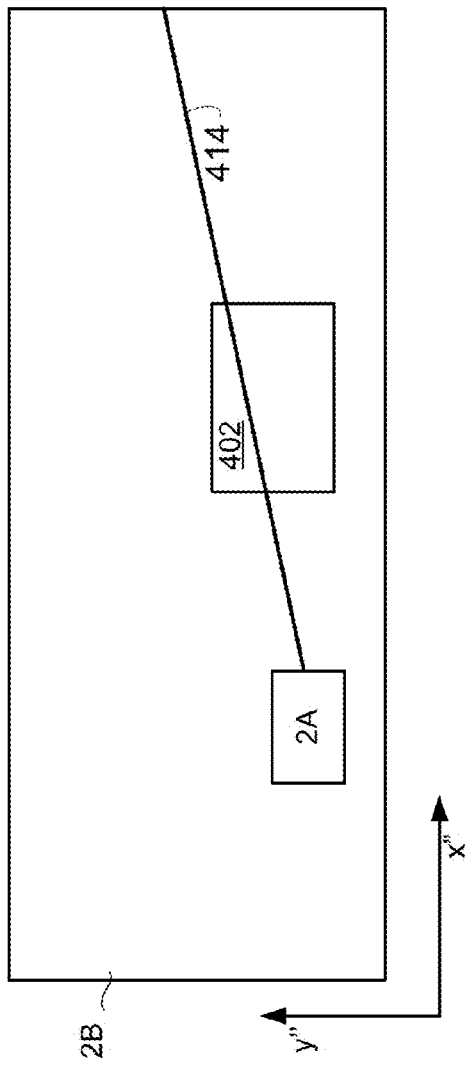
FIG. 4C3
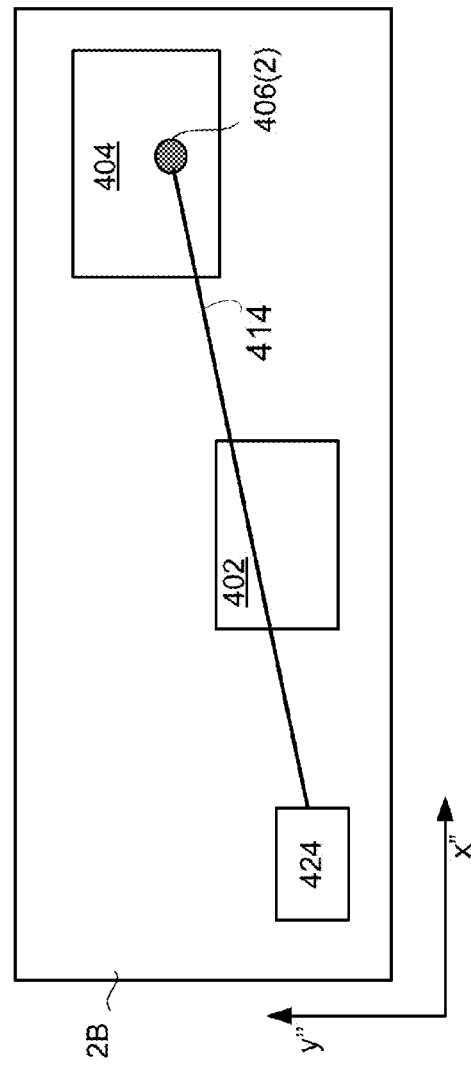
FIG. 4C4

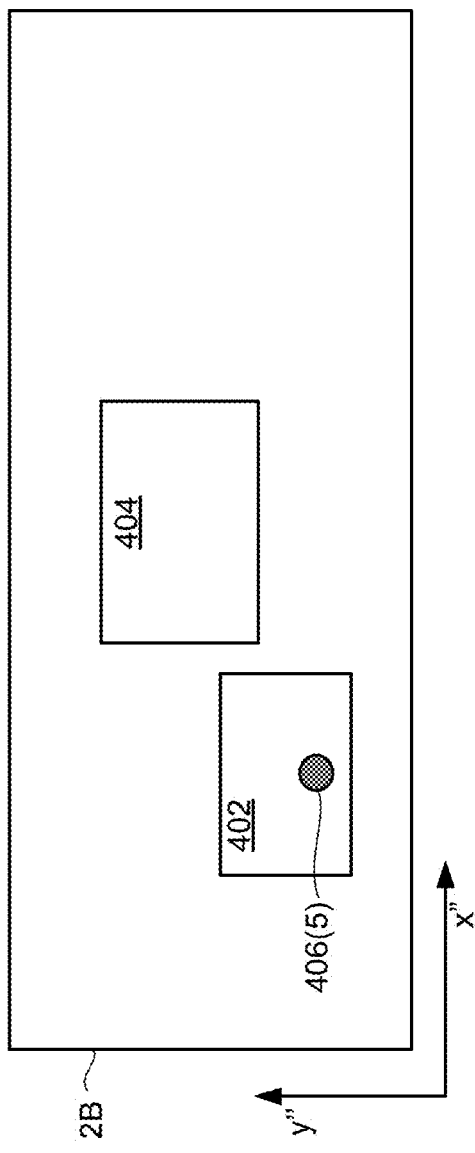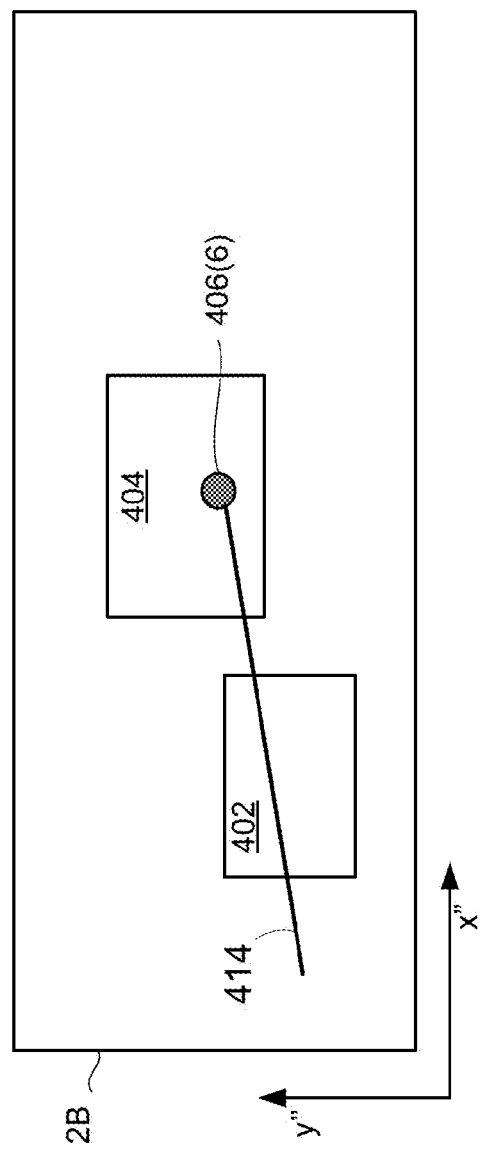

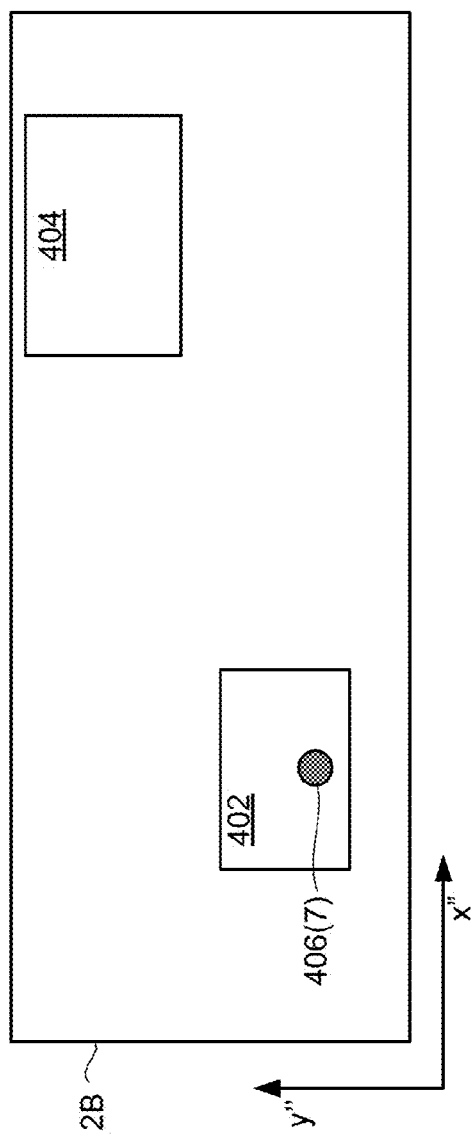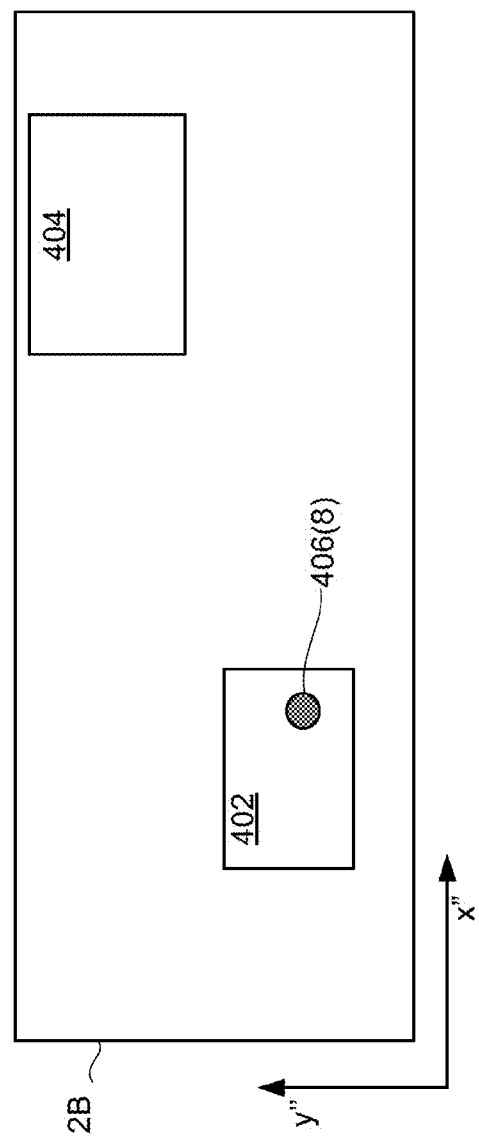

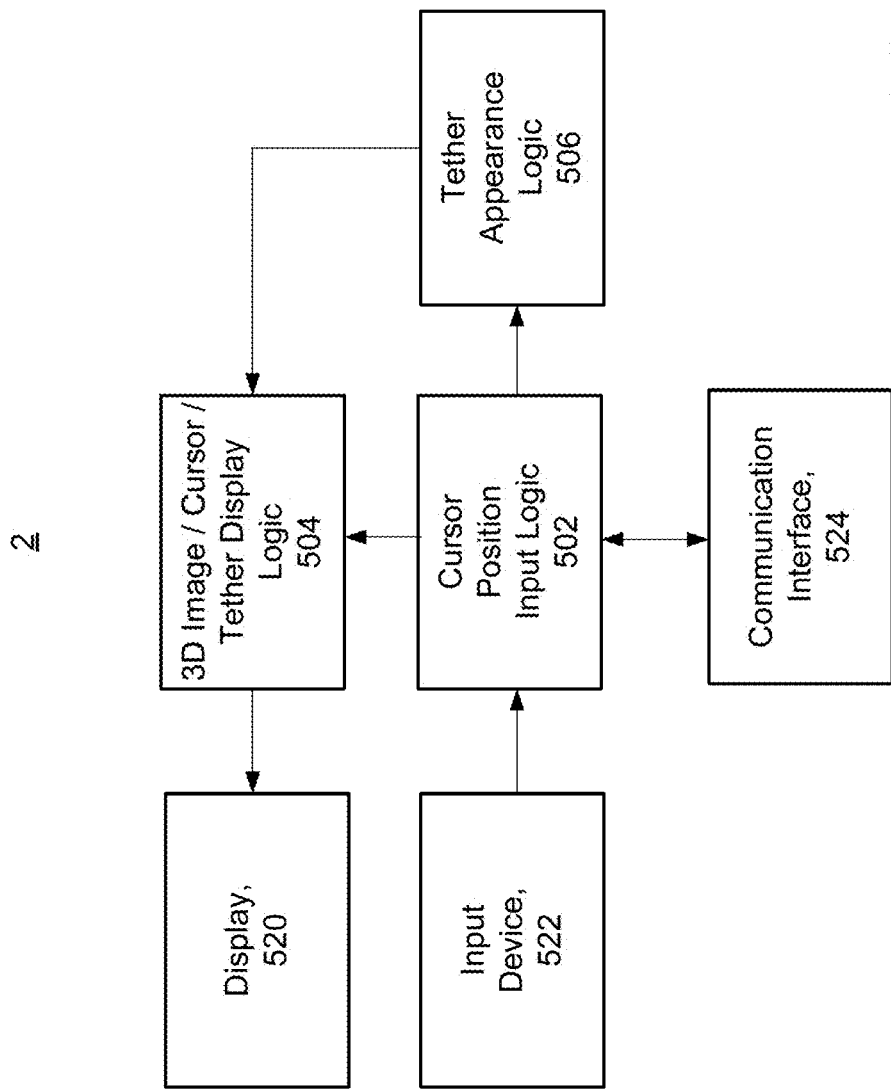

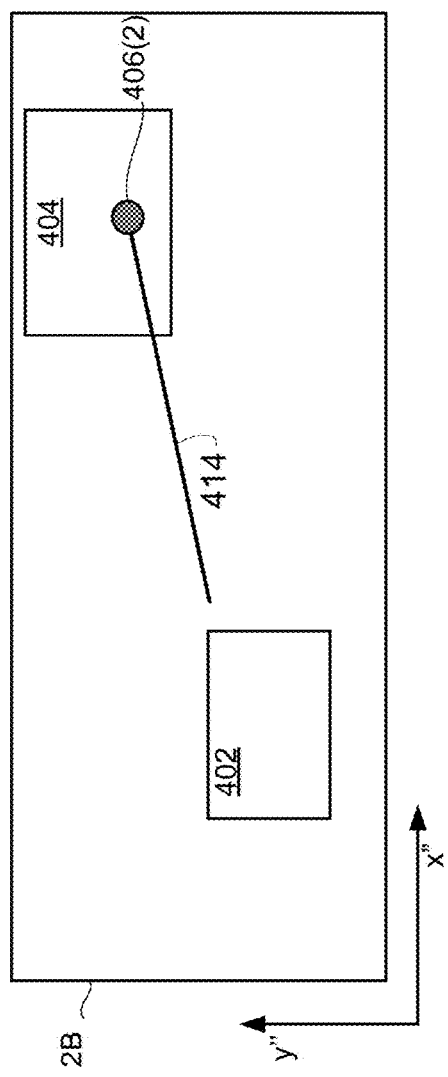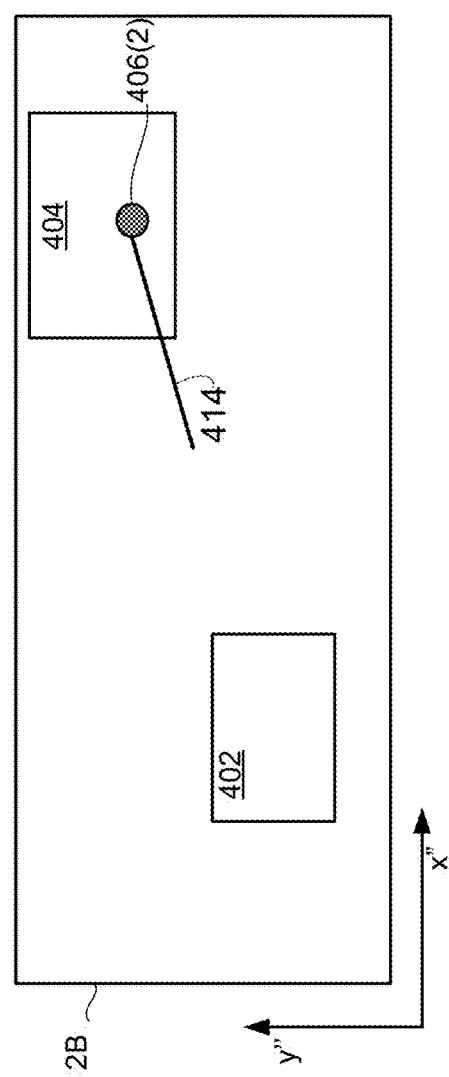

VOLATILITY BASED CURSOR TETHERING

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The objects within an AR environment may include real objects (i.e., objects that exist within a particular real-world environment) and virtual objects (i.e., objects that do not exist within the particular real-world environment).

Multiple people can share in the same AR experience if each has their own display. As one example, a group of engineers could view the same virtual image of an engineering design in their own display. There are a multiple of other possible applications. To allow one person to point out some feature in the AR experience, one person can control a cursor that is displayed in everyone's own display. When one person moves their cursor, it can be difficult for the others to follow the cursor movement in their own display.

SUMMARY

Certain embodiments described herein relate to volatility based cursor tethering. When one person moves their cursor being displayed in a three-dimensional image, there may be a significant change in the location of the cursor in other displays that show the three-dimensional image from a different viewpoint. Therefore, the others may not be able to easily follow the cursor's movement.

An embodiment includes an apparatus comprising a near-eye, see-through display and logic configured in communication with the near-eye, see-through display. The logic is configured to display a three-dimensional image in the near-eye, see-through display such that it appears to be located in a real world environment. The logic is further configured to display a cursor at a position in the three-dimensional image from a viewpoint of a location of the apparatus. The cursor has a depth position in another viewpoint of the three-dimensional image from a different location. The logic is configured change an appearance of a tether linked to the cursor in response to depth position changes of the cursor from the other viewpoint.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a side view of an eyeglass temple of the frame in an embodiment of the see-through, mixed reality display device embodied as eyeglasses providing support for hardware and software components.

FIG. 2B is a top view of an embodiment of an integrated eye tracking and display optical system of a see-through, near-eye, mixed reality device.

FIGS. 4B1 and 4B2 depict an example of what near-eye, head mounted display device 2A of FIG. 4A might display for the two cursor locations.

FIGS. 4C1 and 4C2 depict an example of what near-eye, head mounted display device 2B of FIG. 4A might display for the two cursor locations.

FIGS. 4C3 and 4C4 depict other examples of what near-eye, head mounted display device 2B of FIG. 4A might display for the second cursor location.

FIGS. 4F1 and 4F2 depict an example of what near-eye, head mounted display device 2B of FIG. 4E might display for the cursor locations 406(5), 406(6), respectively.

FIGS. 4H1 and 4H2 depict an example of what near-eye, head mounted display device 2B of FIG. 4G might display for the cursor locations 406(7), 406(8), respectively.

FIG. 5 is a block diagram of one embodiment of a near-eye, head mounted display device system 2 that is configured to present a tether to a cursor in response to changes in depth volatility of the cursor.

FIGS. 9B and 9C depict an example of the tether gradually becoming shorter in response to low or no depth volatility.

DETAILED DESCRIPTION

Figure 1:
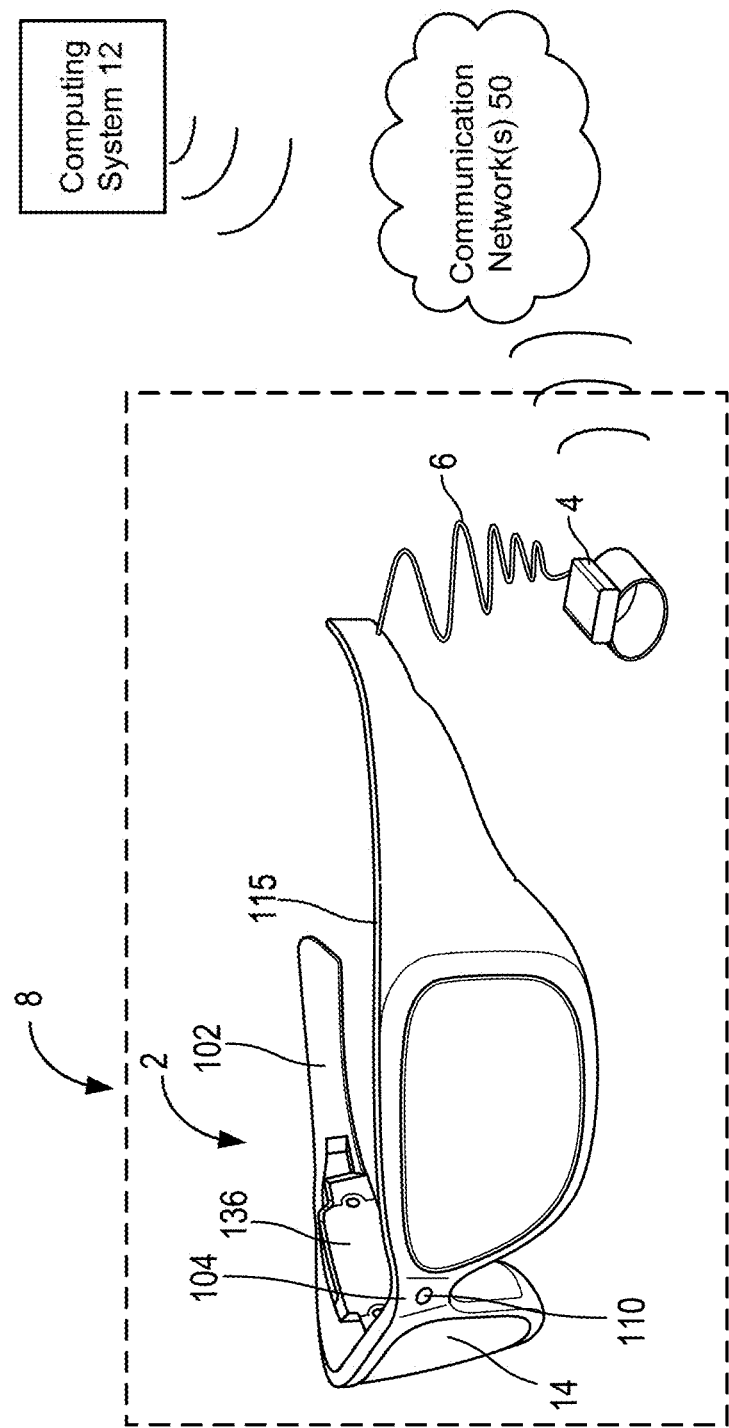
FIG. 1 is a block diagram depicting example components of one embodiment of a see-through, mixed reality display device system.

Certain embodiments of the present technology relate to modifying a tether linked to a cursor, wherein the modifying is based on depth volatility of the cursor. This can help people who are not operating the cursor to track movement of the cursor. One possible application is for a group of two or more people to each have their own display that is capable of displaying three-dimensional images. The three-dimensional image can be displayed in a manner that allows anyone to get a different viewpoint of the three-dimensional image by moving. For example, the three-dimensional image could be displayed such that it seems to be located in a real world environment in the same physical location to everyone, regardless of their location. This allows a person to walk around the room to see the three-dimensional image from a different viewpoint. Note that in this example, each person might see a different viewpoint of the three-dimensional image. Note that this is just one possible application.

The term "cursor" as used throughout this description means any visual indicator that marks a location. The cursor could possibly mark a location for user interaction with a computer system. However, the cursor is not required to allow user interaction with a computer system. The cursor is displayed in a near-eye, head mounted display device, in accordance with embodiments disclosed herein. Note that the location marked by the cursor might be with respect to an image displayed in the near-eye, see-through display device, but is not limited thereto. The cursor could also mark a location on a real world object that is visible through the near-eye, head mounted display device.

One of the people might operate a cursor to help point out something in the three-dimensional image. Because each user can have a different viewpoint, a relatively small change in the cursor position from the viewpoint of the cursor operator might appear as a large change in the cursor position from the viewpoint of a non-operator. For example, a large change in depth of the cursor for the cursor operator might lead to a large angular change in cursor position for someone else. Thus is just one example of how following the cursor could be difficult for the non-operator.

In one embodiment, a tether that is linked to the cursor is used to help non-operators of the cursor follow cursor movement. The tether is a line from the cursor towards the cursor operator, in one embodiment. The tether is not necessarily displayed all of the time so as to not obscure the view of the three-dimensional image.

In one embodiment, a z-depth of the cursor in the three-dimensional image from the viewpoint of the cursor operator is tracked. Changes in the z-depth may be referred to a depth volatility. The appearance of the tether is changed in response to the depth volatility, in one embodiment. For example, when there is not any depth volatility for some period of time, the tether is not displayed. In response to high depth volatility, the tether may be displayed as a relatively long line from the cursor towards the cursor operator. After the depth volatilely subsides, the length of the tether may be gradually reduced.

In some embodiments, the three-dimensional image, cursor, and tether are displayed in a see-through, mixed reality display device system. FIG. 1 is a block diagram depicting example components of one embodiment of a see-through, mixed reality display device system 8. System 8 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. For example, processing unit 4 may be embodied in a mobile device such as a smart phone, tablet or laptop computer. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infrared, RFID transmission, wireless Universal Serial Bus (WUSB), cellular, 3G, 4G or other wireless communication means) over a communication network 50 to one or more hub computing systems 12 whether located nearby in this example or at a remote location. In other embodiments, the functionality of the processing unit 4 may be integrated in software and hardware components of the display device 2.

Head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple and includes control circuitry 136 for the display device 2. Nose bridge 104 of the frame 115 includes a microphone 110 for recording sounds and transmitting audio data to processing unit 4.

FIG. 2A is a side view of an eyeglass temple 102 of the frame 115 in an embodiment of the see-through, mixed reality display device embodied as eyeglasses providing support for hardware and software components. At the front of frame 115 is physical environment facing or outward facing video camera 113 that can capture video and still images which are transmitted to the processing unit 4.

The data from the camera may be sent to a processor 210 of the control circuitry 136, or the processing unit 4 or both, which may process them but which the unit 4 may also send to one or more computer systems 12 over a network 50 for processing. The processing identifies and maps the user's real world field of view.

Control circuits 136 provide various electronics that support the other components of head mounted display device 2. More details of control circuits 136 are provided below with respect to FIG. 3A. Inside, or mounted to the temple 102, are ear phones 130, inertial sensors 132, GPS transceiver 144 and temperature sensor 138. In one embodiment, inertial sensors 132 include a three axis magnetometer 132A, three axis gyro 132B and three axis accelerometer 132C (See FIG. 3A). The inertial sensors are for sensing position, orientation, and sudden accelerations of head mounted display device 2. From these movements, head position may also be determined.

Mounted to or inside the temple 102 is an image source or image generation unit 120. In one embodiment, the image source includes microdisplay 120 for projecting images of one or more virtual objects and lens system 122 for directing images from micro display 120 into a see-through planar waveguide 112. Lens system 122 may include one or more lenses. In one embodiment, lens system 122 includes one or more collimating lenses. In the illustrated example, a reflecting element 124 receives the images directed by the lens system 122 and optically couples the image data into the planar waveguide 112.

There are different image generation technologies that can be used to implement micro display 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Additionally, microdisplay 120 can be implemented using an emissive technology where light is generated by the display, see for example, a PicoP™ display engine from Microvision, Inc. Another example of emissive display technology is a micro organic light emitting diode (OLED) display. Companies eMagin and Microoled provide examples of micro OLED displays.

FIG. 2B is a top view of an embodiment of a display optical system 14 of a see-through, near-eye, augmented or mixed reality device. A portion of the frame 115 of the near-eye display device 2 will surround a display optical system 14 for providing support for one or more optical elements as illustrated here and in the following figures and for making electrical connections. In order to show the components of the display optical system 14, in this case 14r for the right eye system, in the head mounted display device 2, a portion of the frame 115 surrounding the display optical system is not depicted.

In one embodiment, the display optical system 14 includes a planar waveguide 112, an optional opacity filter 114, see-through lens 116 and see-through lens 118. In one embodiment, opacity filter 114 is behind and aligned with see-through lens 116, planar waveguide 112 is behind and aligned with opacity filter 114, and see-through lens 118 is behind and aligned with planar waveguide 112. See-through lenses 116 and 118 may be standard lenses used in eye glasses and can be made to any prescription (including no prescription). In some embodiments, head mounted display device 2 will include only one see-through lens or no see-through lenses. Opacity filter 114, which is aligned with planar waveguide 112, selectively blocks natural light, either uniformly or on a per-pixel basis, from passing through planar waveguide 112. For example, the opacity filter enhances the contrast of the virtual imagery.

The planar waveguide 112 transmits visible light from micro display 120 to the eye 140 of the user wearing head mounted display device 2. The see-through planar waveguide 112 also allows visible light from in front of the head mounted display device 2 to be transmitted through itself 112 to eye 140, as depicted by arrow 142 representing an optical axis of the display optical system 14r, thereby allowing the user to have an actual direct view of the space in front of head mounted display device 2 in addition to receiving a virtual image from the micro display 120. Thus, the walls of planar waveguide 112 are see-through. Planar waveguide 112 includes a first reflecting surface 124 (e.g., a mirror or other surface). Visible light from micro display 120 passes through lens 122 and becomes incident on reflecting surface 124. The reflecting surface 124 reflects the incident visible light from the micro display 120 such that visible light is trapped inside a planar, substrate comprising planar waveguide 112 by internal reflection as described further below.

Infrared illumination and reflections also traverse the planar waveguide 112 for an eye tracking system 134 for tracking the position of the user's eyes. A user's eyes will be directed at a subset of the environment which is the user's area of focus or gaze. The eye tracking system 134 comprises an eye tracking illumination source 134A, which in this example is mounted to or inside the temple 102, and an eye tracking IR sensor 134B, which is this example is mounted to or inside a brow 103 of the frame 115. The eye tracking IR sensor 134B can alternatively be positioned between lens 118 and the temple 102. It is also possible that both the eye tracking illumination source 134A and the eye tracking IR sensor 134B are mounted to or inside the brow 103 of the frame 115.

The technology allows flexibility in the placement of entry and exit optical couplings (which can also be referred to as input- and output-couplers) to and from the waveguide's optical path for the image generation unit 120, the illumination source 134A and the eye tracking IR sensor 134B. The visible illumination representing images and the infrared illumination may enter from any direction about the waveguide 112, and one or more wavelength selective filters (e.g. 127) direct the illumination out of the waveguide centered about the optical axis 142 of the display optical system 14.

In one embodiment, the eye tracking illumination source 134A may include one or more infrared (IR) emitters such as an infrared light emitting diode (LED) or a laser (e.g. VCSEL) emitting about a predetermined IR wavelength or a range of wavelengths. In some embodiments, the eye tracking IR sensor 134B may be an IR camera or an IR position sensitive detector (PSD) for tracking glint positions.

In an embodiment, a wavelength selective filter 123 passes through visible spectrum light from the micro display 120 via reflecting surface 124 and directs the infrared wavelength illumination from the eye tracking illumination source 134A into the planar waveguide 112 where the IR illumination is internally reflected within the waveguide until reaching another wavelength selective filter 127 aligned with the optical axis 142.

From the IR reflections, the position of the pupil within the eye socket can be identified by known imaging techniques when the eye tracking IR sensor 134B is an IR camera, and by glint position data when the eye tracking IR sensor 134B is a type of position sensitive detector (PSD). The use of other types of eye tracking IR sensors and other techniques for eye tracking are also possible and within the scope of an embodiment.

After coupling into the waveguide 112, the visible illumination representing the image data from the micro display 120 and the IR illumination are internally reflected within the waveguide 112. In the example of FIG. 2B, after several reflections off the surfaces of the substrate, the trapped visible light waves reach an array of wavelength selective filters embodied in this example as selectively reflecting surfaces $126_1$ to $126_N$. Additionally, a wavelength selective filter 127 aligned with the optical axis of the display optical system is also positioned in the waveguide 112. Reflecting surfaces 126 couple visible light wavelengths incident upon those reflecting surfaces out of the substrate directed in the direction of the eye 140 of the user.

The reflecting surfaces 126 also pass infrared radiation within the waveguide. However, aligned with the optical axis 142 of the display optical system 14r, is one or more wavelength selective filters 127 which direct not only visible illumination but received infrared illumination from the illumination source 134A. For example, if the reflecting elements 126₁ to 126_N are each reflecting different portions of the visible spectrum, the one or more wavelength selective filters 127 may reflect wavelengths in the red visible spectrum and the infrared spectrum. In other embodiments, the filters 127 can reflect wavelengths covering the entire visible spectrum or a larger portion thereof and the infrared spectrum for wavelengths of IR reflections and those generated by the IR illumination source.

Additionally, an input-coupler (not specifically shown in FIGS. 2A and 2B) directs infrared reflections from the eye which pass through the see-through walls of the planar waveguide centered about the optical axis 142 into an optical path of the planar waveguide in a direction towards an output-coupler (not specifically shown in FIGS. 2A and 2B) that directs infrared light towards the eye tracking IR sensor 134B. Additionally, visible and infrared filters may be stacked in the direction from lens 116 to 118 so that they are all co-axial with the optical axis. For example, a bidirectional hot mirror placed in front of a visible reflecting element with respect to the eye lets visible light pass but reflects IR wavelengths. Additionally, the one or more filters 127 may be embodied as an active grating which is modulated between filtering wavelengths in the visible and infrared spectrums. This would be done at a rate fast enough for the human eye not to detect.

In one embodiment, each eye will have its own planar waveguide 112. When the head mounted display device has two planar waveguides, each eye can have its own micro display 120 that can display the same image in both eyes or different images in the two eyes. Further, when the head mounted display device has two planar waveguides, each eye can have its own eye tracking illumination source 134A and its own eye tracking IR sensor 134B. In another embodiment, there can be one planar waveguide with two optical axes, one for each eye, which spans the nose bridge and reflects visible and infrared light into both eyes.

In the embodiments described above, the specific number of lenses shown are just examples. Other numbers and configurations of lenses operating on the same principles may be used. Additionally, FIGS. 2A and 2B only show half of the head mounted display device 2. A full head mounted display device would include, for example, another set of see through lenses 116 and 118, another opacity filter 114, another planar waveguide 112 with one or more wavelength selective filters 127, another micro display 120, another lens system 122 physical environment facing camera 113 (also referred to as outward facing or front facing camera 113), eye tracking assembly 134, earphone 130, filter 123 and temperature sensor 138.

Figure 3A:
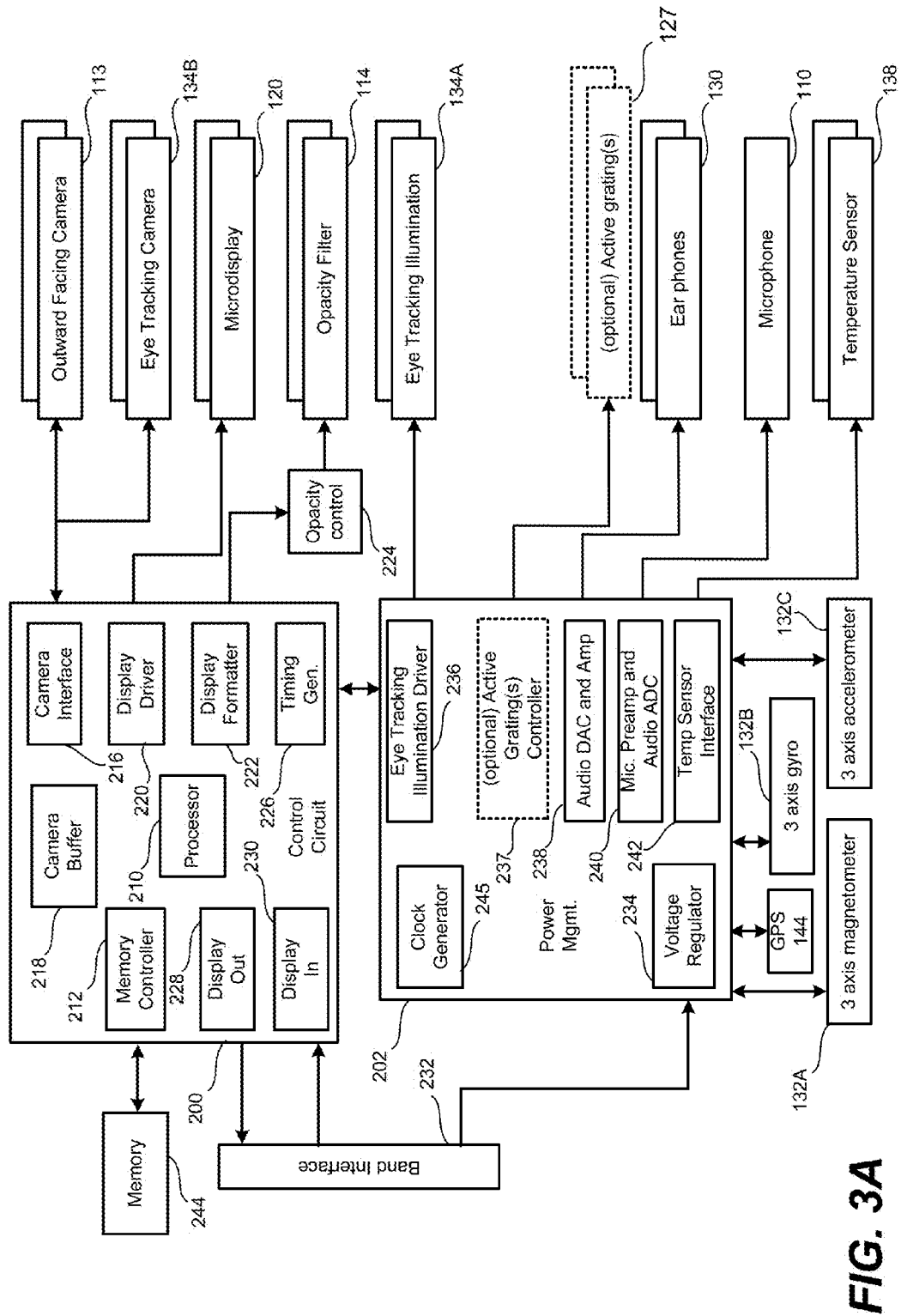
FIG. 3A is a block diagram of one embodiment of hardware and software components of a see-through, near-eye, mixed reality display device as may be used with one or more embodiments.
Figure 3B:
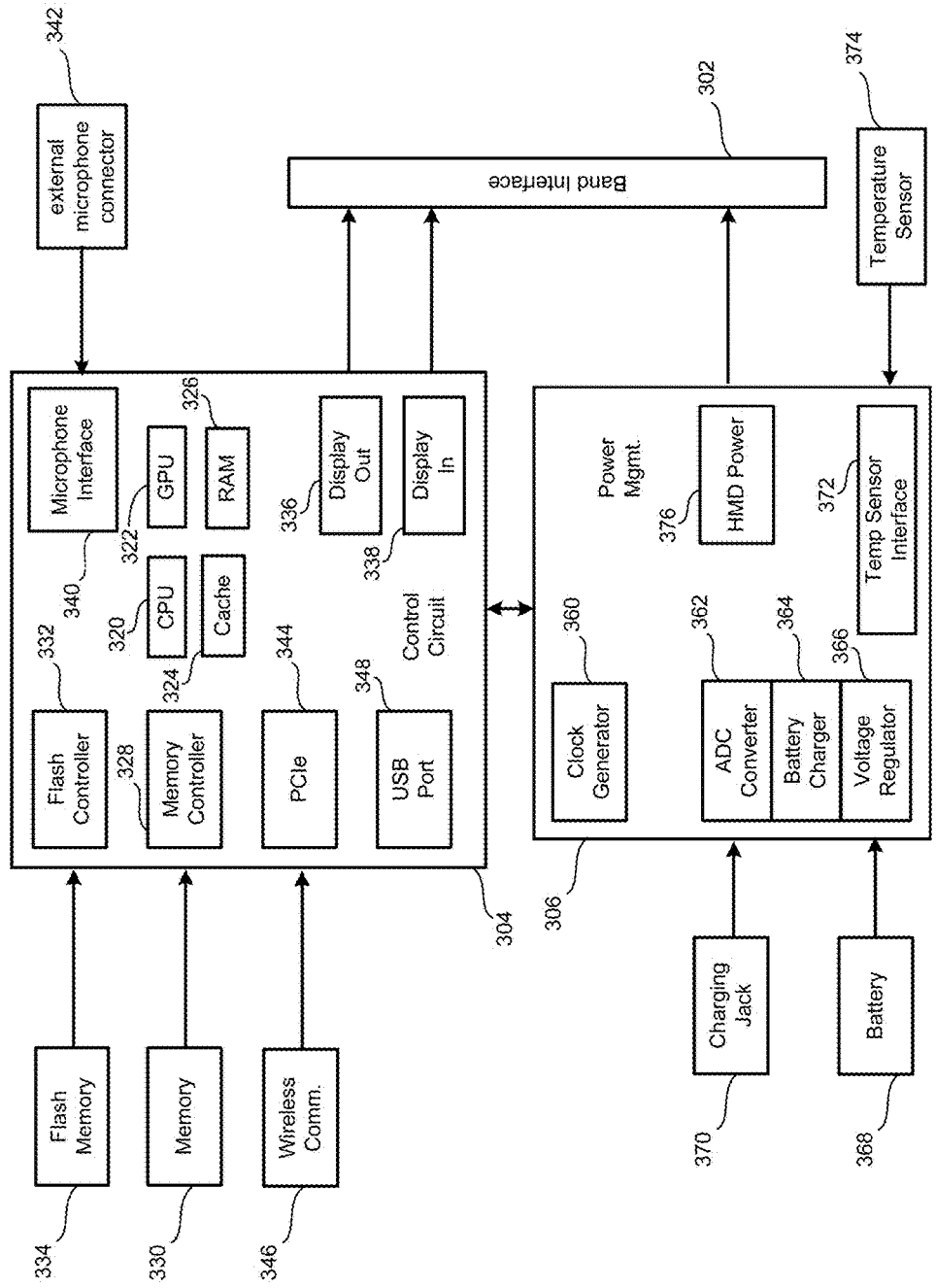
FIG. 3B is a block diagram describing the various components of a processing unit.

FIG. 3A is a block diagram of one embodiment of hardware and software components of a see-through, near-eye, mixed reality display device 2 as may be used with one or more embodiments. FIG. 3B is a block diagram describing the various components of a processing unit 4. In this embodiment, near-eye display device 2, receives instructions about a virtual image from processing unit 4 and provides data from sensors back to processing unit 4. Software and hardware components which may be embodied in a processing unit 4, for example as depicted in FIG. 3B, receive the sensory data from the display device 2 and may also receive sensory information from a computing system 12 over a network 50. Based on that information, processing unit 4 will determine where and when to provide a virtual image to the user and send instructions accordingly to the control circuitry 136 of the display device 2.

Note that some of the components of FIG. 3A (e.g., outward or physical environment facing camera 113, eye camera 134, micro display 120, opacity filter 114, eye tracking illumination unit 134A, earphones 130, one or more wavelength selective filters 127, and temperature sensor 138) are shown in shadow to indicate that there can be at least two of each of those devices, at least one for the left side and at least one for the right side of head mounted display device 2. FIG. 3A shows the control circuit 200 in communication with the power management circuit 202. Control circuit 200 includes processor 210, memory controller 212 in communication with memory 244 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines of one or more buses. In another embodiment, each of the components of control circuit 200 is in communication with processor 210.

Camera interface 216 provides an interface to the two physical environment facing cameras 113 and, in this embodiment, an IR camera as sensor 134B and stores respective images received from the cameras 113, 134B in camera buffer 218. Display driver 220 will drive microdisplay 120. Display formatter 222 may provide information, about the virtual image being displayed on microdisplay 120 to one or more processors of one or more computer systems, e.g. 4 and 12 performing processing for the mixed reality system. The display formatter 222 can identify to the opacity control unit 224 transmissivity settings with respect to the display optical system 14. Timing generator 226 is used to provide timing data for the system. Display out interface 228 includes a buffer for providing images from physical environment facing cameras 113 and the eye cameras 134B to the processing unit 4. Display in interface 230 includes a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242, active filter controller 237, and clock generator 245. Voltage regulator 234 receives power from processing unit 4 via band interface 232 and provides that power to the other components of head mounted display device 2. Illumination driver 236 controls, for example via a drive current or voltage, the eye tracking illumination unit 134A to operate about a predetermined wavelength or within a wavelength range. Audio DAC and amplifier 238 provides audio data to earphones 130. Microphone preamplifier and audio ADC 240 provides an interface for microphone 110. Temperature sensor interface 242 is an interface for temperature sensor 138. Active filter controller 237 receives data indicating one or more wavelengths for which each wavelength selective filter 127 is to act as a selective wavelength filter. Power management unit 202 also provides power and receives data back from three axis magnetometer 132A, three axis gyroscope 132B and three axis accelerometer 132C. Power management unit 202 also provides power and receives data back from and sends data to GPS transceiver 144.

FIG. 3B is a block diagram of one embodiment of the hardware and software components of a processing unit 4 associated with a see-through, near-eye, mixed reality display unit. FIG. 3B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, cellular, 3G, 4G communication devices, wireless USB (WUSB) communication device, RFID communication device etc. The wireless communication component 346 thus allows peer-to-peer data transfers with for example, another display device system 8, as well as connection to a larger network via a wireless router or cell tower. The USB port can be used to dock the processing unit 4 to another display device system 8. Additionally, the processing unit 4 can dock to another computing system 12 in order to load data or software onto processing unit 4 as well as charge the processing unit 4. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

Figure 4A:
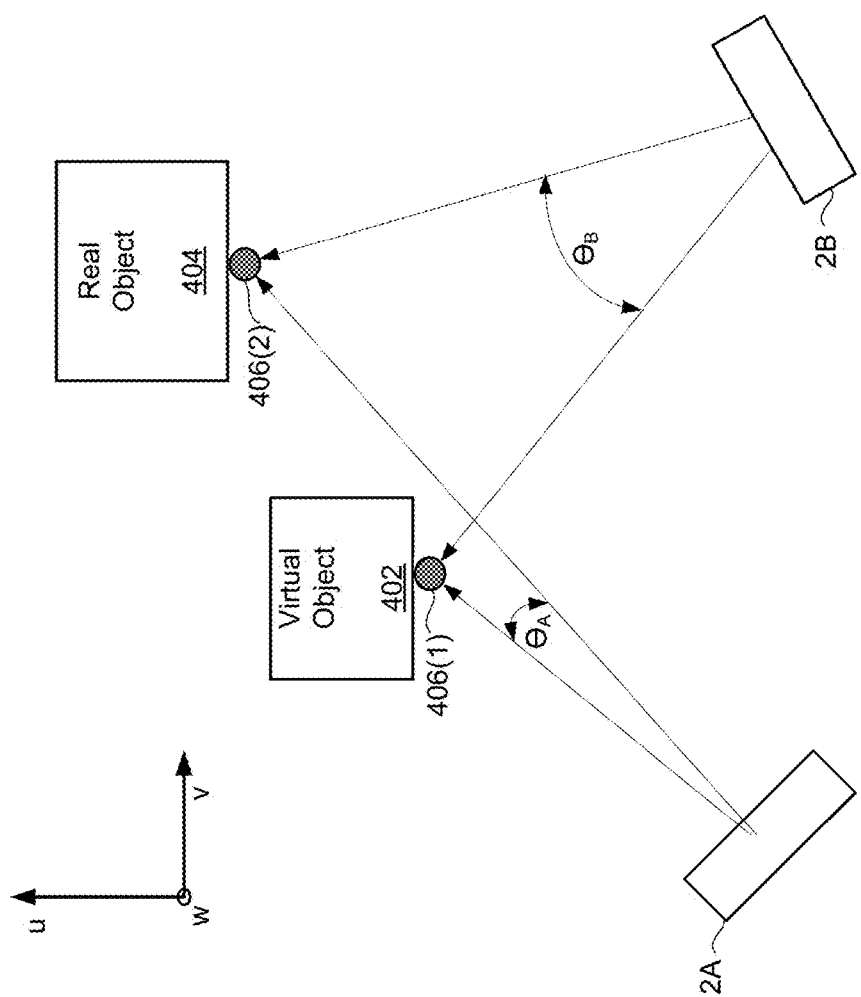
FIG. 4A depicts an example environment to illustrate cursor usage.

FIG. 4A depicts an example environment to illustrate cursor usage. Two near-eye, see-through display devices 2A, 2B are depicted. The devices are head mounted display devices, in one embodiment. Each near-eye, see-through display device 2A, 2B is configured to display the virtual object 402. Note that because each of the display devices 2A, 2B displays the same virtual object 402, the user of each display device 2A, 2B shares the same AR experience. The display devices 2A, 2B may be configured such that the users can move about to see the virtual object 402 from different viewpoints, although that is not a requirement. Thus, each near-eye, see-through display device 2A, 2B may be configured to display the virtual object from the viewpoint at the location of the respective display device 2A, 2B.

Each display device 2A, 2B is configured to display the virtual object 402 as part of a three-dimensional image. The three-dimensional image may be displayed such that it appears to be located in a real world environment. The three-dimensional image may be displayed with respect to a common frame of reference. FIG. 4A shows a global (or world) coordinate system having a u-axis, v-axis, and w-axis. In this example, the w-axis may correspond to a vertical direction, and the u- and v-axis correspond to orthogonal horizontal directions. The u- and v-axis may each be perpendicular to the w-axis. Thus, in this example a three-dimensional Cartesian coordinate system is used. However, a different type of coordinate system could be used.

When the display devices 2A, 2B display the three-dimensional image, the global coordinates may be transformed to local coordinates for the present location of the display device 2, in one embodiment. The local coordinates may also be referred to as a display coordinate system. In one embodiment, the local coordinates have a depth or z-position, which may correspond to how far a point is (or is to seem to appear) from the display device 2. The local coordinates may also have an image plane. The image plane may comprise an x- and y-coordinate.

Also, a real world object 404 is depicted. The real world object 404 is not displayed by the display devices 2A, 2B, but could be visible through the displays of near-eye, head mounted display device 2A and/or 2B, depending on the direction the user wearing the device 2A, 2B is looking.

A cursor 406 may be used to help the user of one of the display devices 2A, 2B point out something about either the virtual object 402 or the real object 404. In this example, the cursor is being operated by the user of near-eye, see-through display device 2A. The cursor is displayed in each of the display devices 2A, 2B, in this example.

Typically, each near-eye, see-through display device 2A, 2B displays the cursor 406 to appear to be at about the same depth as the object it is presently linked to in order to help each user properly focus their eyes on both the cursor and the object being pointed out by the cursor.

The location of the cursor 406 may move in response to input by the cursor operator. A location of a cursor 406 is represented for two distinct points in time. Initially, the cursor 406 is linked to the virtual object 402, as represented by cursor 406(1). Later in time, the cursor is linked to the real object 404, as represented by cursor 406(2). These changes are driven in response to input provided to display device 2A by the user of display device 2A, in this example.

Because the user of near-eye, head mounted display device 2A is driving the cursor, that user can anticipate cursor movements, which helps that user follow the cursor. However, the other user(s) may have trouble following cursor movement. FIG. 4A depicts an especially difficult cursor movement for the user at near-eye, see-through display device 2B to follow. Note that the movement of the cursor 406 from virtual object 402 to real object 404 resulted in a relatively small angular displacement ($\theta_A$) from the viewpoint of the user at near-eye, see-through display device 2A. However, the angular displacement ($\theta_B$) from the viewpoint of the user at near-eye, see-through display device 2B is much larger. This large change in angular displacement is a factor in making it difficult to follow changes in cursor location.

Also note that in this example there is a rather abrupt change in the z-depth of the cursor 406 from the viewpoint of near-eye, head mounted display device 2A. Note that the z-depth corresponds to the length of the arrows from display device 2A to the respective cursors 406(1), 406(2), in this example. This abrupt change in the z-depth of the cursor 406 from the viewpoint of near-eye, head mounted display device 2A may be a factor in the rather large change in the angular displacement ($\theta_B$) from the viewpoint of the user at near-eye, head mounted display device 2B.

Further note that the cursor location changed from the virtual object 402 to the real object 404. This is an additional factor that may make it difficult to track the cursor's movement. Of course, it can still be difficult to track cursor movement without all of the foregoing factors present.

FIGS. 4B1 and 4B2 depict an example 3D image that near-eye, see-through display device 2A might display for the two cursor locations, 406(1), 406(2), respectively. FIGS. 4C1 and 4C2 depict an example of what near-eye, see-through display device 2B might display for the two cursor locations, 406(1), 406(2), respectively.

Each near-eye, see-through display device 2A, 2B renders the cursor 406 such that initially it appears to be linked to the virtual object 402. This is depicted in FIGS. 4B1 and 4C1. At a later point in time, the user at near-eye, see-through display device 2A has provided input that causes the cursor to be linked to the real world object 404. This is depicted in FIG. 4B2. Note that FIGS. 4B1 and 4B2 show an x'/y'image plane for the near-eye, head mounted display device 2A. FIGS. 4C1 and 4C2 show an x"/y" image plane for the near-eye, head mounted display device 2B.

Referring now to FIG. 4C2, after the cursor 406 is moved to the real world object 404, head mounted display device 2B renders a tethering line 414 from the present location of the cursor 406(2) towards a location of display device 2A (not depicted in FIG. 4C2). The tethering line 414 helps the user at display device 2B to locate the new cursor location 406(2). Also, the tethering line 414 helps the user at display device 2B to instantly recognize who is operating the cursor.

Note that angular displacement ($\theta_B$) from the viewpoint of the user at near-eye, see-through display device 2B may be so great that the new cursor location may be out of the field of view of near-eye, see-through display device 2B. This is represented in FIG. 4C3. In this example, the user can still see a portion of the tethering line 414, but the cursor 406 is not visible in display of display device 2B. In this example, the tethering line 414 appears to contact display device 2A, which helps the user to instantly recognize who is causing the cursor movement. In this example, display device 2A refers to the actual real world device 2A. This may help the user to instinctively shift their attention towards the real world object 404 so that the cursor becomes visible in display device 2B (as in, for example, FIG. 4C2).

In one embodiment, the tethering line 414 is displayed between the cursor location and an avatar, or the like, that represents a virtual location of the driver of the cursor. Referring briefly to the example of FIG. 4A, the two near-eye, head mounted display devices 2A, 2B may be located near each other. For example, they may be in the same room, or otherwise, "local" to each other. However, the operator of the cursor might be located remotely from the near-eye, head mounted display device that is displaying the cursor. For example, the two near-eye, head mounted display devices 2A, 2B might be located in different cities, or otherwise be located remotely from each other. In this case, a "virtual location" for near-eye, see-through display devices 2A may be determined locally to near-eye, see-through display device 2B. This virtual location could be expressed in terms of the global coordinate system of FIG. 4A. As one example, the location of near-eye, see-through display devices 2A in FIG. 4A may be a "virtual location", whereas the location of near-eye, head mounted display devices 2B may be its real location. FIG. 4C4 depicts an example of what near-eye, head mounted display device 2B might display for cursor 406(2). The tethering line 414 goes between cursor 406(2) and an avatar 424 that represents a virtual location of display device 2A. The avatar 424 is a virtual object being display in display device 2A. The avatar 424 might resemble the actual person operating display device 2A, might be a generic representation of a person, or some other representation.

Figure 4D:
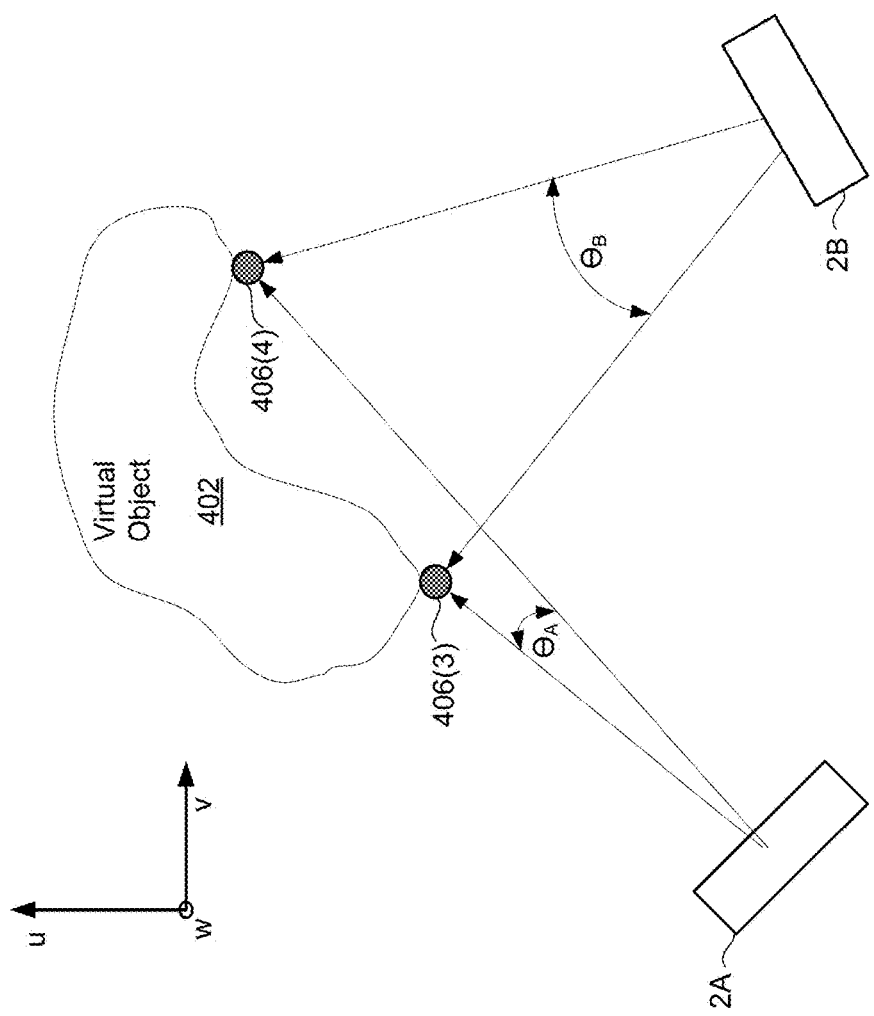
FIG. 4D depicts an example in which the cursor is moved between two cursor locations.

The foregoing examples used a virtual object 402 and real world object 404 for purposes of discussion. The cursor 406 might move from one virtual object to another virtual object; from one real world object to another real world object; or from a real world object to a virtual object. Also, in some cases, the cursor 406 might remain on the same virtual object or on the same real world object at the two points in time. FIG. 4D depicts an example in which the cursor 406 is moved from cursor location 406(3) at an initial time to cursor location 406(4) at a later time. Both cursor locations 406(3), 406(4) are linked to the same virtual object 402. A similar case could arise for a real object. In each of these cases, the foregoing problems of a person who is not the cursor operator following cursor movement can be an issue.

Figure 4E:
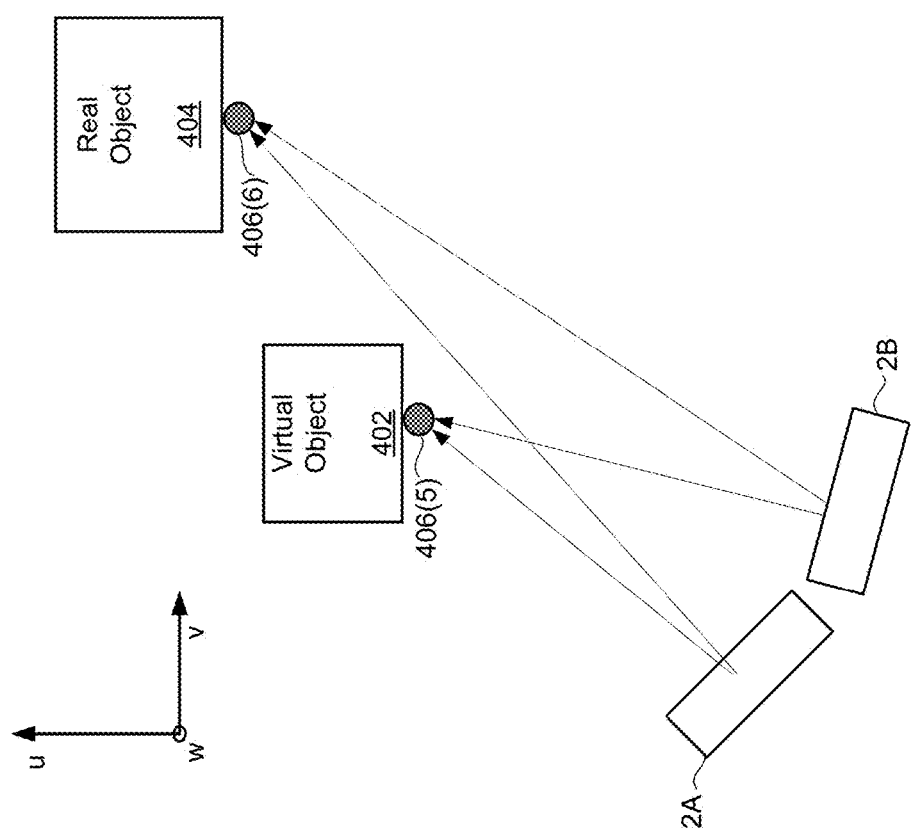
FIG. 4E depicts an example in which two near-eye, head mounted display devices 2A, 2B are relatively close to one another.

In the example of FIG. 4A, there is a relatively large separation between the two near-eye, see-through display devices 2A, 2B. However, cursor movement could be hard to follow even if there is little physical separation of the near-eye, see-through display devices 2A, 2B. FIG. 4E depicts an example in which the two near-eye, head mounted display devices 2A, 2B are relatively close to one another. Again, an example will be used in which the user of near-eye, see-through display devices 2A is operating the cursor 406. At a first point in time, the cursor is at cursor location 406(5) linked to the virtual object 402. At a later point in time, the user moves the cursor to cursor location 406(6) linked to the real object 404. In this example, the angular change from the viewpoint of display device 2B is not necessarily all that great. However, in this example, the change in z-depth from the viewpoint of the near-eye, head mounted display 2B is fairly large. Also, the object to which the cursor 406 is linked changes. Either or both of these factors may make it difficult for a user who is not driving the cursor follow the cursor movement.

FIGS. 4F1 and 4F2 depict an example of what near-eye, see-through display device 2B might display for the cursor locations 406(5), 406(6), respectively. FIG. 4F1 shows the initial cursor location 406(5) linked to virtual object 402. FIG. 4F2 shows the later cursor location 406(6) linked to real object 404. To help the user locate the new position of the cursor, a tethering line 414 is displayed by display device 2B, in this embodiment. The tethering line 414 is linked to the cursor at cursor location 406(6). The tethering line 414 goes from cursor location 406(6) towards the general direction of the operator of the cursor, in this example. In other words, the tethering line 414 may go from cursor location 406(6) towards the general direction of display device 2A (or an avatar that represents a virtual location of the display device 2A). The tethering line 414 may serve as a marker to identify a location of the person operating the cursor. The tethering line 414 need not actually appear to contact the person operating the cursor movement (or their display device). FIG. 4F2 does not show the person operating the cursor, but one possibility is for the person driving the cursor movement to be visible through the display of head mounted display device 2B. Of course, it may be that the person driving the cursor movement is out of the field of view of the display of head mounted display device 2B. Even so, the user of display device 2B may still quickly be able to discern who is driving the cursor movement. This knowledge itself can help the user to locate the new position of the cursor.

Figure 4G:
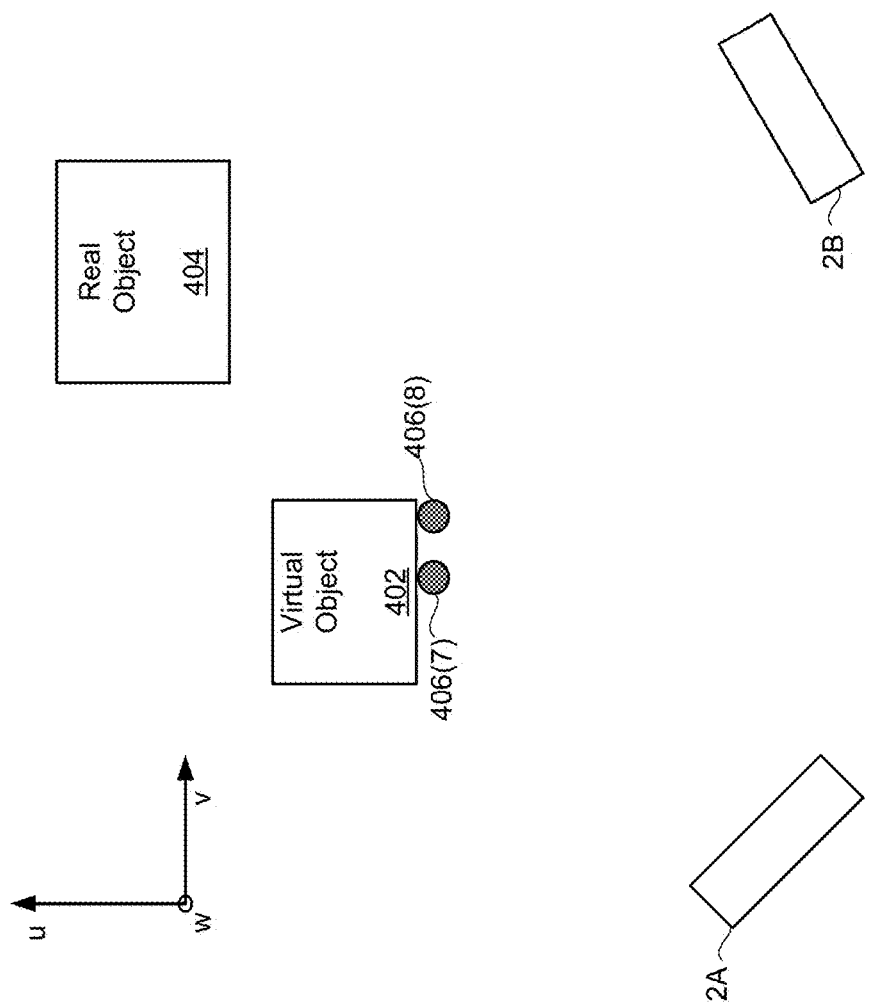
FIG. 4G depicts an example of cursor movement that might not present too difficult of a problem for non-drivers of cursor movement to track.

FIG. 4G depicts an example of cursor movement that might not present too difficult of a problem for non-drivers of cursor movement to track. In this example, the cursor is initially at cursor location 406(7). Then, the user of display device 2A moves the cursor to cursor location 406(8). In this example, the amount of change might not present much of a problem for the user at display device 2B to follow. Note that there is not much angular displacement from the viewpoint of the display device 2B in this example. Also, there is not a significant change in depth from the viewpoint of display device 2B. Likewise, there is not a significant change in depth from the viewpoint of display device 2A. Moreover, the object to which the cursor is linked does not change.

FIGS. 4H1 and 4H2 depict an example of what near-eye, head mounted display device 2B might display for the cursor locations 406(7), 406(8), respectively. FIG. 4H1 shows the initial cursor location 406(7) linked to virtual object 402. FIG. 4H2 shows the later cursor location 406(8) still linked to virtual object 402, but displaced slightly in the x" direction. In this case, it is not necessary for near-eye, see-through display device 2B to display a tethering line 414. Showing such a tethering line 414 in this case might tend to obscure the virtual object 402 being displayed. It could also possibly obscure some real object. In general, displaying a tethering line 414 when it is not needed to help the user locate the cursor in response to a significant change in location of the cursor might tend to distract the user. Hence, the near-eye, head mounted display device 2B makes an intelligent decision of when the tethering line 414 is useful and when it might be distracting and displays accordingly, in one embodiment.

FIG. 5 is a block diagram of one embodiment of a near-eye, head mounted display device system 2 that is configured to present a tether linked to a cursor in response to changes in depth volatility of the cursor. The system 2 comprises cursor position input logic 502, 3D image cursor/tether display logic 504, tether appearance logic 506, display 520, input device 522, and communication interface 524.

The cursor position input logic 502 is configured to receive input that describes a position of the cursor. This input could be received from input device 522, which allows the cursor operator to drive the cursor. This input could also be received over communication link, which allows another near-eye, see-through display device system 2 to provide the cursor position. Note that the cursor position input logic 502 may receive input from the input device 522 and then send information over the communication interface 524 to allow other systems 2 to determine where the cursor should be displayed.

The cursor position input logic 502 may generate data that describes where the cursor should be displayed. This applies whether the input comes from input device 522 or communication interface 524. In one embodiment, the generated data includes an x-position, a y-position, and a depth position. The x- and y-positions may be for an image plane. The depth position may also be referred to as a z-position or z-depth. These positions may be from a frame of reference of the system 2. Thus, each system 2 could use its own frame of reference to display the cursor 2. In other words, when more than one system 2 is displaying the cursor, the systems might use different coordinates to describe where the cursor should be displayed on the display 520 of that particular system 2. The foregoing are for purposes of illustration; other techniques can be used to describe where the cursor should be displayed. The cursor position input logic 502 may send information to the 3D image cursor/tether display logic 504 to enable it to properly display the cursor.

The input device 522 can be implemented in a wide variety of ways, which allows the cursor to be operated using many different techniques. For example, the cursor might be operated by tracking eye gaze, tracking head position/orientation, tracking position/orientation of the system 2, tracking hand position/orientation, voice commands, etc. Thus, the input device 522 may include, but is not limited to, eye tracking camera 134B, eye tracking illumination 134A, microphone 110, GPS 144, 3 axis gyro 132B, 3 axis magnetometer 132A, 3 axis accelerometer 132C.

The communication interface 524 could include, but is not limited to, wireless communication component 346, a Wi-Fi enabled communication device, a Bluetooth communication device, an infrared communication device, cellular, 3G, 4G communication devices, a wireless USB (WUSB) communication device, and/or an RFID communication device.

The tether appearance logic 506 is configured to determine how the tether 414 should appear. The tether appearance logic 506 may determine when to display the tether and when not to display the tether. The tether appearance logic 506 may determine the brightness of the tether, length of the tether, or other physical characteristics of the tether. The tether appearance logic 506 may receive data from the cursor position logic 502 that describes where the cursor should be displayed. The tether appearance logic 506 may send information to the 3D image cursor/tether display logic 504 to enable it to properly display the tether.

The 3D image/cursor/tether display logic 504 controls how the cursor and tether are displayed on display 520. Display 520 may be implemented using, but is not limited to, display optical system 14, planar waveguide 112, optional opacity filter 114, see-through lens 116, see-through lens 118, micro display 120. The 3D image cursor/tether display logic 504 may be configured to display the cursor and tether in a three-dimensional image. In one embodiment, the system 2 is configured to access a three-dimensional image that is linked to a real world coordinate system. For example, the three-dimensional image could be described in terms of the coordinate system of FIG. 4A. However, the 3D image/cursor/tether display logic 504 may be configured to transform that coordinate system to a local coordinate system. The three-dimensional image may be one that is being displayed by more than one system 2. Hence, the three-dimensional image might be generated externally to the system 2. For example one system 2 might generate the three-dimensional image and share it with others. In this case, the three-dimensional image may be accessed over communication interface 524.

The cursor position input logic 502, the 3D image cursor/tether display logic 504, and the tether appearance logic 506 may be implemented in hardware, software, or some combination of hardware and software. In one embodiment, logic 502, 504, and/or 506 are implemented, at least in part, by executing instructions on a processor. Many of the components of FIGS. 3A and/or 3B may be used. For example, cursor position input logic 502 could be implemented by one or more of (but is not limited to) control circuit 200, processor 210, memory 244, memory controller 244, camera interface 216, controls circuit 304, graphics processing unit (GPU) 322, cache 324, RAM 326, memory control 328, memory 330 (e.g., D-RAM), flash memory controller 332, flash memory 334, microphone interface 340, external microphone connector 342, PCI express interface, USB port(s) 348.

Tether appearance logic 506 could be implemented by one or more of (but is not limited to) control circuit 200, processor 210, memory 244, memory controller 244, controls circuit 304, graphics processing unit (GPU) 322, cache 324, RAM 326, memory control 328, memory 330 (e.g., D-RAM), flash memory controller 332, flash memory 334.

3D image cursor/tether display logic 504 could be implemented by one or more of (but is not limited to) control circuit 200, processor 210, display driver 220, display formatter 222, display in 230, display out 228, band interface 232, timing generator 226, controls circuit 304, graphics processing unit (GPU) 322, cache 324, RAM 326, memory control 328, memory 330 (e.g., D-RAM), flash memory controller 332, flash memory 334.

Figure 6:
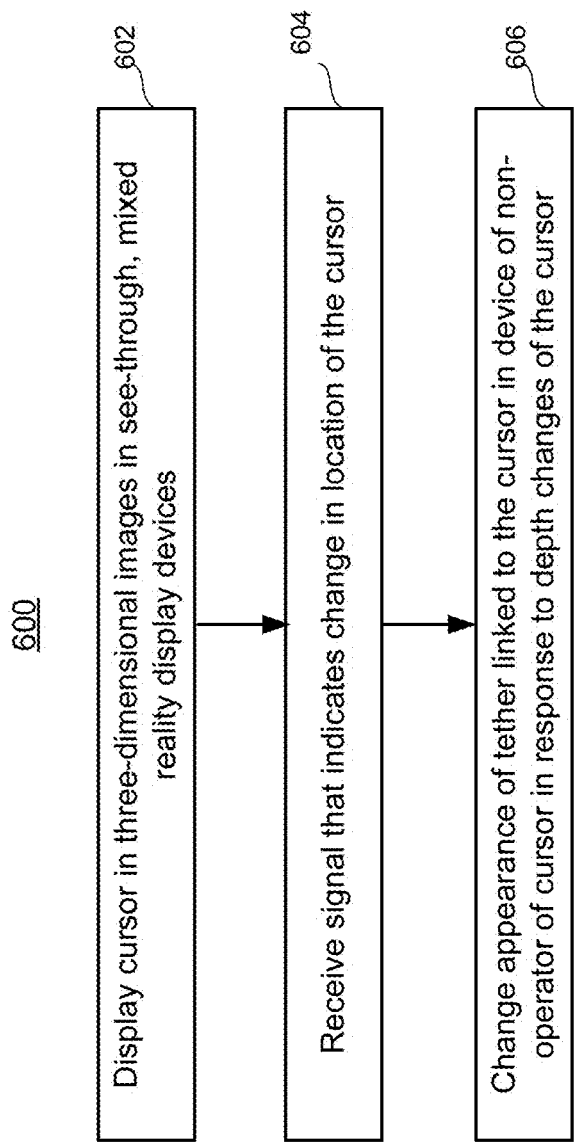
FIG. 6 is a flowchart of one embodiment of a process 600 of displaying a tether linked to a cursor in response to changes in depth of the cursor.

FIG. 6 is a flowchart of one embodiment of a process 600 of displaying a tether linked to a cursor, including changing appearance of the tether in response to changes in depth of the cursor. The process 600 may be implemented by one or more near-eye, head mounted display device systems 2 such as, but not limited to those described herein.

In step 602 a cursor is displayed in a three-dimensional image in a near-eye, see-through display device system 2. In one embodiment, more than one near-eye, see-through displays each display a three-dimensional image such that it appears to be at the same physical location regardless of the location of the near-eye, see-through display 2. This may be referred to as the three-dimensional image being linked to a real world coordinate system. For example, referring to FIG. 4A, display devices 2A and 2B each display virtual object 402 such that virtual object 402 appears to be at the same physical location with respect to the real world coordinate system. The virtual object 402 may also be displayed such that it appears to have the same orientation with respect to the real world coordinate system. However, each near-eye, see-through display 2 may display the three-dimensional image from its own viewpoint, based on its own location. Thus, display device 2A and 2B may show different viewpoints of the virtual object 402, since they are at different locations. Note that when a display device 2 is located remotely it may be assigned a virtual location in the real world coordinate system.

The cursor 406 may be linked to a real object or a virtual object. Real objects, as well as virtual objects typically have some coordinates so that the system 2 knows how to display the virtual object to appear as part of an augmented reality. Likewise, the cursor typically has coordinates. The coordinates of the cursor may be such that the cursor appears to be just at a surface of the real or virtual object. This may create an appearance that the cursor is linked to the real of virtual object.

In one embodiment, the cursor is assigned coordinates in the real world coordinate system, which may be transformed to local coordinates of the near-eye, see-through displays each display 2. The cursor is displayed in each display device 2 such that it appears to be at the same real world coordinates, in one embodiment.

In step 604, the near-eye, head mounted display device system 2 receives a signal that indicates a change in location of the cursor. Numerous examples have been given herein, but step 604 is not limited to these examples. One possible change in the location of the cursor is a depth change. This depth change may be a change in depth from the viewpoint of the person operating the cursor. Stated another way, the depth change may be from the viewpoint of the location of the display device 2 that receives input that changes the location of the cursor. For example, the depth change may be a change in z-depth as being displayed by the near-eye, head mounted display device system 2 of the cursor operator.

In step 606, an appearance of a tether 414 linked to the cursor is changed in response to depth changes in the cursor. Step 606 may include many different types of changes in the appearance of the tether 414. In one embodiment, step 606 includes making visibility of the tether respond to depth position volatility of the cursor. For example, the tether may be made more visible in response to increases in depth volatility of the cursor, and less visible in response to decreases in depth volatility of the cursor. One example of making the tether more visible is to increase a length of a tether line. One example of making the tether less visible is to decrease a length of a tether line. The foregoing is an example of making the size of the tether proportional to depth position volatility. The size of the tether may be grown/shrunk in some other manner. The tether could be made more visible by increasing its brightness, and less visible by decreasing its brightness. Thus, the brightness may be proportional to volatility of the depth position. Other possibilities exist.

Figures 7, 8:
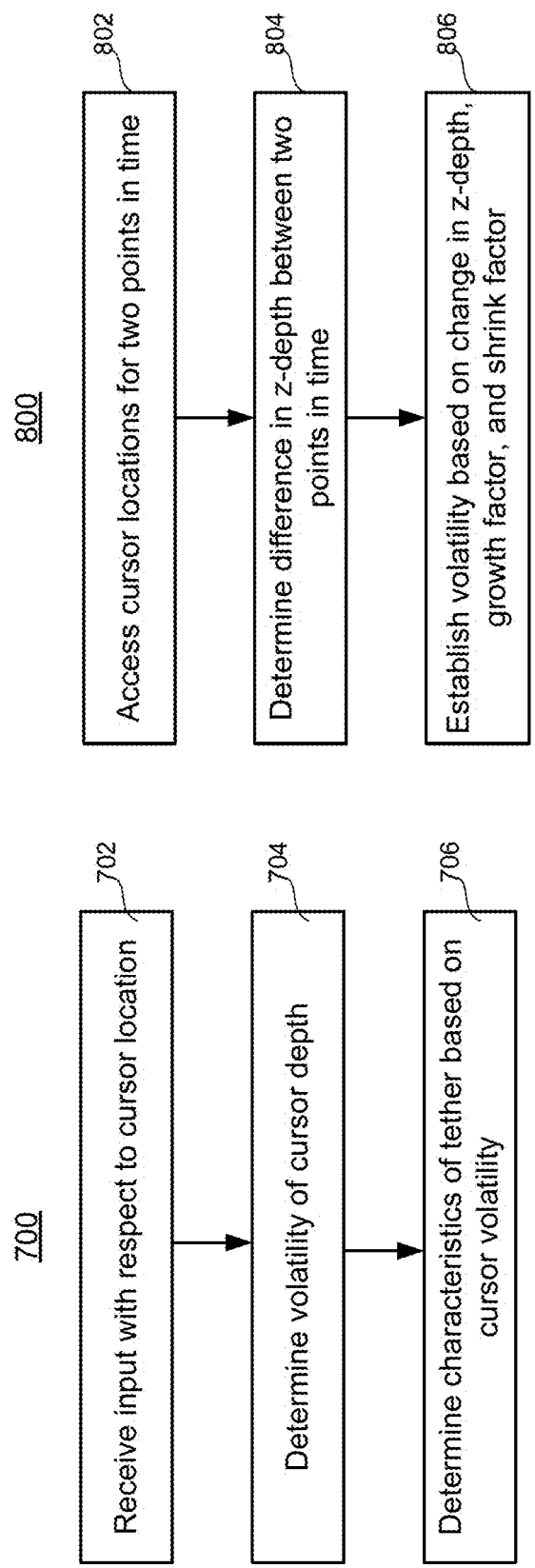
FIG. 7 is a flowchart of one embodiment of a process 700 of determining characteristics for a tether in response to depth volatility.
FIG. 8 is a flowchart of one embodiment of a process 800 of determining cursor depth volatility.

FIG. 7 is a flowchart of one embodiment of a process 700 of determining characteristics for a tether in response to depth volatility. The process 700 may be used in step 606 of process 600. The process 700 may be implemented by a near-eye, see-through display device system 2 such as, but not limited to those described herein.

In step 702, input with respect to the cursor location is received. In one embodiment, the cursor location has a z-depth. This z-depth is for the near-eye, see-through display device system 2 of the cursor operator, in one embodiment.

In step 704, a volatility of cursor depth is determined. The volatility of cursor depth refers to how fast the z-depth is changing, in one embodiment. As noted above, this is the z-depth for the near-eye, head mounted display device system 2 of the cursor operator, in one embodiment.

In step 706, characteristics of the tether are determined based on the cursor volatility. These characteristics may include, but are not limited to, length of the tether and brightness of the tether. Other characteristics that make the tether stand out may also be determined in step 706.

In general, when the z-depth has high volatility, the tether may be made to stand out more. In contrast, when the z-depth has low volatility, the tether may be made less apparent. One example is to growth the length of a tether in response to volatility exceeding a first threshold and to shrink the length of a tether in response to volatility being below a second threshold. Another example is to make the tether brighter in response to high volatility (e.g., volatility exceeding a threshold) and to make the tether dimmer in response to low volatility (e.g., being below a threshold).

FIG. 8 is a flowchart of one embodiment of a process 800 of determining cursor depth volatility. The process 800 may be used in step 704 of process 700. The process 800 may be implemented by a near-eye, head mounted display device system 2 such as, but not limited to those described herein.

In step 802, cursor locations for two points in time are accessed. These could be for two consecutive frames to be presented in the near-eye, head mounted display device system 2. However, step 802 is not limited to this example.

In step 804, the difference in z-depth between the two locations is determined. In one embodiment, the z-depth is for the cursor to be rendered by the system 2 of the operator of the cursor.

Step 806 is to establish the cursor volatility based on the difference in z-depth. Step 806 also factors in a growth factor and a shrink factor, in one embodiment. The growth factor may be a parameter that can be set to establish how fast the volatility grows in response to a certain depth change. The shrink factor may be a parameter that can be set to establish how fast the volatility shrinks over time. Note that the growth and shrink factors may thus be used to establish how fast the tether characteristics change in response to changes in z-depth.

For example, just after a large z-depth change, the volatility parameter may be quite high (e.g., may exceed a threshold). When the volatility parameter is applied in step 706 of process 700 this may result in the tether having a long line from the cursor position towards the cursor operator, as one example. After this large cursor movement, the cursor may remain relatively stationary for some time. Thus, from one frame to the next, the z-depth change may be little or none (e.g., volatility parameter may be below a threshold). In this case, the shrink factor may be used to shrink the volatility parameter over time. When the volatility parameter is applied in step 706 of process 700 this may result in the tether line gradually shrinking over time. Eventually, the tether line may shrink to the point that it vanishes. In other words, as some point in time, all that is displayed is the cursor (no tether is displayed).

Figures 9A, 10:
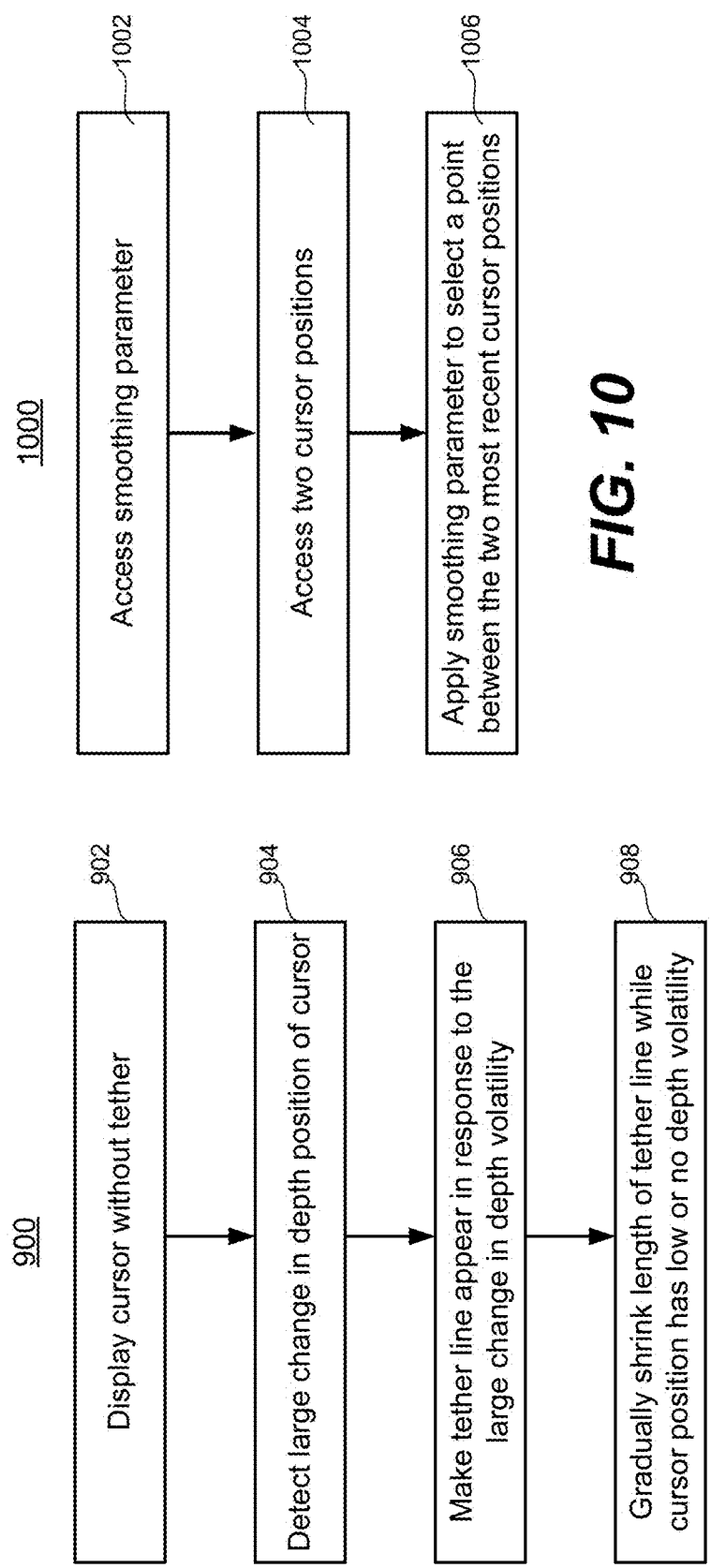
FIG. 9A is a flowchart of one embodiment of a process 900 of changing the characteristics of a tether in response to cursor volatility.
FIG. 10 is a flowchart of one embodiment of a process 1000 of smoothing changes in cursor location.

FIG. 9A is a flowchart of one embodiment of a process 900 of changing the characteristics of a tether in response to cursor volatility. Process 900 is one embodiment of step 706 of process 700. Process 900 may be performed by a near-eye, head mounted display device system 2 of a non-operator of the cursor.

In step 902, the cursor is displayed in the near-eye, head mounted display device system 2 without the tether. Step 902 refers to the near-eye, head mounted display device system 2 of non-operators of the cursor, in one embodiment. An example is depicted in FIG. 4C1, which shows a cursor 406(1) being displayed as being linked to the virtual object 402.

In step 904, a large change in depth position of the cursor is detected. The depth position is with respect to the near-eye, head mounted display device system 2 of the operator of the cursor, in one embodiment. Process 800 may be used to characterize the magnitude of the change in depth position. In one embodiment, step 904 tests for whether depth volatility is greater than a threshold.

In step 906, a tether line is made to appear in response to the large change in depth position. An example is depicted in FIG. 4C2, which shows a cursor 406(2) being displayed as being linked to the real object 404. Also, the tether 414 is linked to the cursor 406(2). In this example, the tether 414 comprises a line from the cursor 406. The line points in the general direction of the operator of the cursor, in one embodiment. Step 906 refers to the near-eye, head mounted display device system 2 of non-operators of the cursor, in one embodiment.

The amount of depth volatility that is needed to trigger displaying the tether line can be an adjustable parameter. One possibility is for the length of the line to be proportional to the depth volatility. Thus, the volatility that is determined in step 806 of process 800 could be used to establish the length of the tether line. There could be a minimum level of depth volatility that is needed to trigger making the tether line appear. Once this minimum level of depth volatility occurs, the length of the tether line may be proportional to the depth volatility. Alternatively, once the minimum level of depth volatility occurs the tether line might be established as some length that is not necessarily proportional to the depth volatility. Other techniques could be used to establish the length of the tether line.

In step 908, the length of the tether line is gradually shortened while the depth volatility of the cursor is low or has no depth volatility. An example is depicted in FIGS. 9B and 9C, which shows the length of the tether gradually becoming shorter. FIGS. 9B and 9C show the cursor 406(2) in the same x-y position as FIG. 4C2. Although the z-depth is not shown in those Figures, the z-depth is not changing either. Thus, the length of the tether 414 gradually shortens while the z-depth has no volatility. Eventually, the tether 414 may be removed completely. The z-depth might has some small amount of volatility, which could be ignored or treated as no volatility. For example, the cursor might move somewhat due to, for example, slight motions of the person operating the cursor that are not intended to move the cursor. Step 908 refers to the near-eye, head mounted display device system 2 of non-operators of the cursor, in one embodiment.

Other characteristics of the tether may be changed as an alternative to, or in addition to, the length of the tether line. For example, one alternative to process 900 is to change the brightness of the tether in steps 906, 908 in addition to, or instead of, changing the length of the tether line.

In one embodiment, the movement of the cursor is smoothed to help the non-operator follow its movement. FIG. 10 is a flowchart of one embodiment of a process 1000 of smoothing changes in cursor location. The process 1000 may be implemented by a near-eye, head mounted display device system 2 such as, but not limited to those described herein.

In step 1002, a smoothing parameter is accessed. The smoothing parameter can be used to slow down how fast the cursor moves from one frame to the next frame that is displayed in near-eye, head mounted display device system 2.

In step 1004, two cursor positions are accessed. In one embodiment, these positions could be expressed in the local coordinate system of the display device 2 of the person operating the cursor. However, these positions could be expressed in a different coordinate system. For example, these two cursor positions could be expressed in the local coordinate system of the display device 2 that is displaying the cursor.

In one embodiment, the cursor has an x-coordinate, a y-coordinate, and a z-coordinate. The two cursor positions may be for any two points in time. These two points in time may be associated with two consecutive frames, which could potentially be displayed in the display system 2. However, some blending may be performed prior to displaying the frames, as will be explained below.

In step 1006, the smoothing parameter is applied to the two consecutive cursor positions. In one embodiment, step 1006 results in a cursor position that is somewhere between the two consecutive cursor positions. For example, a lerping function may be applied to the two consecutive cursor positions. The smoothing parameter can be used to establish whether the final cursor position is relatively close to the first position, relatively close to the second position, etc.

In one embodiment, only the z-position is smoothed in step 1006. Thus, the x- and y-positions may be unaffected by the smoothing operation. This technique may be used when the cursor coordinates are expressed in the local coordinate system of the display device 2 of the cursor operator, but is not limited thereto.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the present technology.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. An apparatus comprising:
   a near-eye, see-through display; and
   logic configured in communication with the near-eye, see-through display and configured to:
   display a three-dimensional image in the near-eye, see-through display such that it appears to be located in a real world environment from a viewpoint of a wearer of the near-eye, see-through display;
   receive a location of a cursor linked to the three-dimensional image;
   receive a depth position of the cursor from a viewpoint of an operator of the cursor;
   display the cursor linked to the three-dimensional image in the near-eye, see-through display based on the received location of the cursor, wherein a user looking through the near-eye, see-through display is a non-operator of the cursor; and
   change an appearance of a tether linked to the cursor in the near-eye, see-through display in response to depth position changes of the cursor from the viewpoint of the operator of the cursor.

2. The apparatus of claim 1, wherein the logic is further configured to:
   display the tether in the near-eye, see-through display to have a size that is proportional to a depth position volatility of the cursor from the viewpoint of the operator of the cursor.

3. The apparatus of claim 1, wherein the logic is further configured to:
   make the tether more visible in response to increases in volatility of the depth position of the cursor; and
   make the tether less visible in response to decreases in volatility of the depth position of the cursor.

4. The apparatus of claim 1, wherein the logic is further configured to:
   display the tether as a line linked to the cursor in the near-eye, see-through display; and
   change a length of the line in response to volatility of the depth position of the cursor from the viewpoint of the operator of the cursor.

5. The apparatus of claim 1, wherein the logic is further configured to:
   make the tether appear in the near-eye, see-through display in response to the cursor going from stationary with respect to a depth from the viewpoint of the operator of the cursor to changing in the depth position from the viewpoint of the operator of the cursor; and
   make the tether gradually disappear in the near-eye, see-through display in response to the cursor being stationary with respect to the depth position changes from the viewpoint of the operator of the cursor.

6. The apparatus of claim 1, wherein the logic is further configured to:
   display the tether in the near-eye, see-through display to have a brightness that is proportional to volatility of the depth position of the cursor from the viewpoint of the operator of the cursor.

7. The apparatus of claim 6, wherein the logic is further configured to:
   increase brightness of the tether in response to a depth position volatility of the cursor from the viewpoint of the operator of the cursor exceeding a first threshold; and
   gradually decrease the brightness of the tether in response to the depth position volatility of the cursor from the viewpoint of the operator of the cursor being below a second threshold.

8. The apparatus of claim 1, wherein the operator of the cursor is remote from the apparatus and the logic is further configured to:
   display an avatar in the near-eye, see-through display that represents the remote operator of the cursor; and
   display the tether as a line from the cursor towards the avatar.

9. The apparatus of claim 1, wherein the operator of the cursor is local to the apparatus and the logic is further configured to display the tether as a line from the cursor towards a local location of the cursor operator.

10. The apparatus of claim 1, wherein the logic is further configured to: smooth position changes of the cursor over time.

11. The apparatus of claim 1, wherein the logic is configured to display the three-dimensional image in the near-eye, see-through display such that it appears to be located at the same physical location that another near-eye, see-through display worn by the operator of the cursor makes the three-dimensional image appear to be located.

12. A head mounted display device, comprising:
    a near-eye, see-through display; and
    a processor in communication with the near-eye, see-through display and configured to:
    display a three-dimensional image in the near-eye, see-through display from a viewpoint of the head mounted display device such that it appears to be located at the same physical location that another head mounted display device makes another three-dimensional image appear to be located;
    receive a location and z-depth of a cursor in the other three-dimensional image, wherein the z-depth of the cursor is from a viewpoint of the other three-dimensional image from the other head mounted display device, wherein the other head mounted display device operates the cursor;
    display the cursor at a position in the three-dimensional image in the near-eye, see-through display based on the received location; and
    change an appearance of a tether linked to the cursor in the near-eye, see-through display in response to changes in the z-depth of the cursor.

13. The head mounted display device of claim 12, wherein the processor is configured to display the tether as a line from the cursor in the near-eye, see-through display towards the other head mounted display device.

14. The head mounted display device of claim 13, wherein the processor is configured to change a length of the line in response to volatility of the z-depth of the cursor.

* * * * *